US009324011B2

(12) United States Patent
Naka

(10) Patent No.: US 9,324,011 B2
(45) Date of Patent: Apr. 26, 2016

(54) PROCESSING APPARATUS AND PROCESSING METHOD FOR PROCESSING PRINT JOBS

(71) Applicant: CANON KABUSHIKI KAISHA, Tokyo (JP)

(72) Inventor: Akiteru Naka, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/727,681

(22) Filed: Jun. 1, 2015

(65) Prior Publication Data

US 2015/0356385 A1    Dec. 10, 2015

(30) Foreign Application Priority Data

Jun. 6, 2014    (JP) .................................. 2014-117849

(51) Int. Cl.
 *G06K 15/00*    (2006.01)
 *G06K 15/02*    (2006.01)
(52) U.S. Cl.
 CPC .................................. *G06K 15/1807* (2013.01)
(58) Field of Classification Search
 CPC .......... G06K 15/1807; G06K 15/1809; G06K 15/00; G06K 15/02
 USPC ............................................. 347/12; 358/1.1
 See application file for complete search history.

(56) References Cited

U.S. PATENT DOCUMENTS

2011/0205591 A1*  8/2011 Ushiku ................. G06K 15/02
                                                    358/1.15
2012/0236362 A1*  9/2012 Inoue .................... G06F 1/3284
                                                    358/1.15

FOREIGN PATENT DOCUMENTS

JP      2006155308 A   *   6/2006
JP      2007-83523 A       4/2007

OTHER PUBLICATIONS

Matsuda, MachineTranslation of JP 2006155308 A, 2006.*

* cited by examiner

*Primary Examiner* — Geoffrey Mruk
*Assistant Examiner* — Scott A Richmond
(74) *Attorney, Agent, or Firm* — Canon U.S.A., Inc. IP Division

(57) ABSTRACT

A processing apparatus includes a generation unit configured to generate print data that is based on a print job, an identification unit configured to identify a preparation time necessary for preparing the print data to be generated by the generation unit, a prediction unit configured to predict a permitted time permitted until preparation of second print data to be printed after first print data is printed is completed on the basis of a preparation time necessary for preparing the first print data, a reception unit configured to receive a supply request for the print data when printing is to be carried out by a printing unit, and a determination unit configured to determine whether print data of a predetermined unit including the second print data generated by the generation unit is to be stored in a print data storage unit.

13 Claims, 17 Drawing Sheets

FIG. 5

| PRINT JOB NUMBER | PAGE NUMBER | RIP TIME | IMAGE SIZE | PRINTING METHOD | TIME PERMITTED BEFORE PRINTING |
|---|---|---|---|---|---|
| 00001001 | 1<br>2<br>3<br>4 | 300<br>330<br>310<br>400 | A4 | 1 in 1<br>2 COPIES<br>SINGLE-SIDED PRINTING | NA<br>NA<br>NA<br>480 |
| 00001002 | 1<br>2<br>3<br>4 | 310 → 110<br>310 → 110<br>320 → 110<br>330 → 110 | A4 | 1 in 1<br>1 COPY<br>SINGLE-SIDED PRINTING | 240<br>210<br>180<br>150 |
| 00001003 | 1<br>2<br>3<br>4 | 110 → 20<br>110 → 20<br>120 → 20<br>130 → 20 | L-SIZE | 2 in 1<br>1 COPY<br>SINGLE-SIDED PRINTING | 120<br>120<br>60<br>60 |
|  |  |  |  |  |  |

FIG. 12A

| PRINT JOB NUMBER | PAGE NUMBER | RIP TIME | IMAGE SIZE | PRINTING METHOD | TIME PERMITTED BEFORE PRINTING |
|---|---|---|---|---|---|
| 00002001 | 1<br>2<br>3<br>4 | 300<br>330<br>310<br>470 | A4 | 1 in 1<br>2 COPIES<br>SINGLE-SIDED<br>PRINTING | NA<br>NA<br>NA<br>480 |
| 00002002 | 1<br>2<br>3<br>4 | 220<br>200<br>190<br>150 | A4 | 1 in 1<br>1 COPY<br>SINGLE-SIDED<br>PRINTING | 170 |
|  |  |  |  |  |  |
|  |  |  |  |  |  |

1201 → 00002001 row; 1202 → 00002002 row; 1203 → RIP TIME (job 1); 1204 → TIME PERMITTED (job 1); 1205 → IMAGE SIZE (job 2); 1206 → TIME PERMITTED (job 2)

FIG. 12B

| PRINT JOB NUMBER | PAGE NUMBER | RIP TIME | IMAGE SIZE | PRINTING METHOD | TIME PERMITTED BEFORE PRINTING |
|---|---|---|---|---|---|
| 00002001 | 1<br>2<br>3<br>4 | 300<br>330<br>310<br>470 | A4 | 1 in 1<br>2 COPIES<br>SINGLE-SIDED<br>PRINTING | NA<br>NA<br>NA<br>480 |
| 00002002 | 1<br>2<br>3<br>4 | 220 → 110<br>200 → 110<br>190 → 110<br>150 → 110 | A4 | 1 in 1<br>1 COPY<br>SINGLE-SIDED<br>PRINTING | 170<br>140<br>110<br>80 |
|  |  |  |  |  |  |
|  |  |  |  |  |  |

1207 → RIP TIME (job 2); 1208 → TIME PERMITTED (job 2)

FIG. 12C

| PRINT JOB NUMBER | PAGE NUMBER | RIP TIME | IMAGE SIZE | PRINTING METHOD | TIME PERMITTED BEFORE PRINTING |
|---|---|---|---|---|---|
| 00002001 | 1<br>2<br>3<br>4 | 300 → 110<br>330 → 110<br>310 → 110<br>470 → 110 ~1209 | A4 | 1 in 1<br>2 COPIES<br>SINGLE-SIDED<br>PRINTING | NA<br>NA<br>NA<br>480 |
| 00002002 | 1<br>2<br>3<br>4 | 220   110<br>200   110<br>190   110<br>150   110 ~1210 | A4 | 1 in 1<br>1 COPY<br>SINGLE-SIDED<br>PRINTING | 530<br>390<br>270<br>160 ~1211 |
|  |  |  |  |  |  |
|  |  |  |  |  |  |

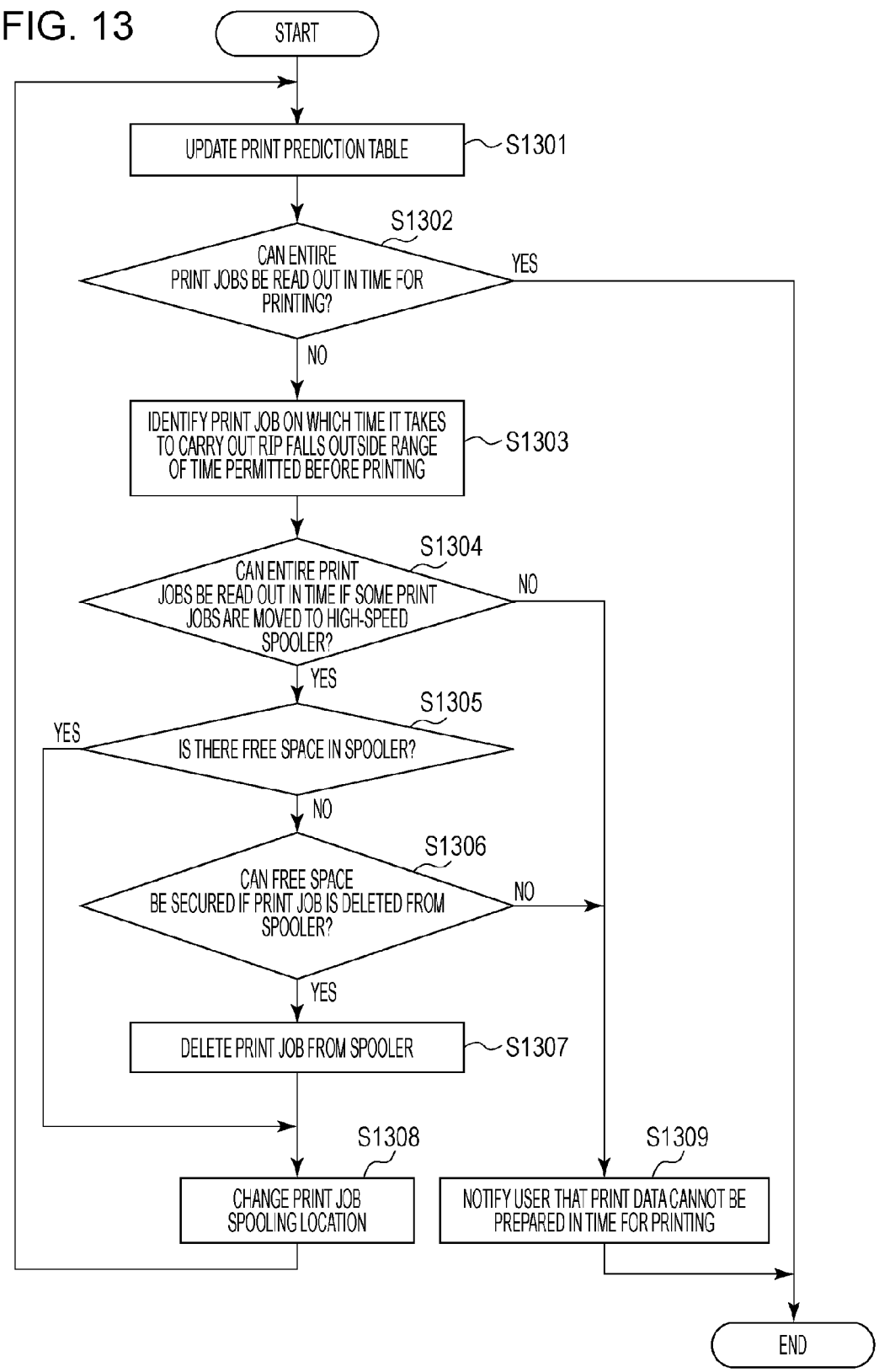

FIG. 14A

| PRINT JOB NUMBER | PAGE NUMBER | RIP TIME | IMAGE SIZE | PRINTING METHOD | TIME PERMITTED BEFORE PRINTING | |
|---|---|---|---|---|---|---|
| 1401 — 00003001 | 1<br>2<br>3<br>4 | 160<br>160<br>160<br>160 | A4 | 1 in 1<br>2 COPIES<br>SINGLE-SIDED<br>PRINTING | NA<br>NA<br>NA<br>480 | 1406 |
| 1402 — 00003002 | 1<br>2<br>3<br>4 | 120<br>120<br>120<br>120 | A4 | 1 in 1<br>1 COPY<br>SINGLE-SIDED<br>PRINTING | 480<br>440<br>400<br>360 | 1408 |
| 1403 — 00003003 | 1<br>2<br>3<br>4 | 160<br>160<br>160<br>160 | A4 | 1 in 1<br>2 COPIES<br>SINGLE-SIDED<br>PRINTING | 320<br>320<br>320<br>320 | 1410 |
| 1404 — 00003004 | 1<br>2<br>3<br>4 | 120<br>120<br>120<br>120 | A4 | 1 in 1<br>1 COPY<br>SINGLE-SIDED<br>PRINTING | 280<br>240<br>200<br>160 | 1412 |

FIG. 14B

| PRINT JOB NUMBER | PAGE NUMBER | RIP TIME | IMAGE SIZE | PRINTING METHOD | TIME PERMITTED BEFORE PRINTING | |
|---|---|---|---|---|---|---|
| 00003001 | 1<br>2<br>3<br>4 | 160<br>160<br>160<br>160 | A4 | 1 in 1<br>2 COPIES<br>SINGLE-SIDED<br>PRINTING | END<br>END<br>END<br>END | 1413 |
| 00003002 | 1<br>2<br>3<br>4 | 120<br>120<br>120<br>120 | A4 | 1 in 1<br>1 COPY<br>SINGLE-SIDED<br>PRINTING | NA<br>NA<br>NA<br>240 | 1414 |
| 00003003 | 1<br>2<br>3<br>4 | 160<br>160<br>160<br>160 | A4 | 1 in 1<br>2 COPIES<br>SINGLE-SIDED<br>PRINTING | 200<br>200<br>200<br>200 | 1415 |
| 00003004 | 1<br>2<br>3<br>4 | 120<br>120<br>120<br>120 | A4 | 1 in 1<br>1 COPY<br>SINGLE-SIDED<br>PRINTING | 200<br>160<br>120<br>80 | 1416 |

FIG. 14C

| PRINT JOB NUMBER | PAGE NUMBER | RIP TIME | IMAGE SIZE | PRINTING METHOD | TIME PERMITTED BEFORE PRINTING |
|---|---|---|---|---|---|
| 00003001 | 1<br>2<br>3<br>4 | 160<br>160<br>160<br>160 | A4 | 1 in 1<br>2 COPIES<br>SINGLE-SIDED<br>PRINTING | END<br>END<br>END<br>END |
| 00003002 | 1<br>2<br>3<br>4 | 120<br>120<br>120<br>120 | A4 | 1 in 1<br>1 COPY<br>SINGLE-SIDED<br>PRINTING | NA<br>NA<br>NA<br>240 |
| 00003003 | 1<br>2<br>3<br>4 | 160 → 110<br>160 → 110<br>160 → 110<br>160 → 110 ~1417 | A4 | 1 in 1<br>2 COPIES<br>SINGLE-SIDED<br>PRINTING | 200<br>250<br>300<br>350 ~1418 |
| 00003004 | 1<br>2<br>3<br>4 | 120<br>120<br>120<br>120 | A4 | 1 in 1<br>1 COPY<br>SINGLE-SIDED<br>PRINTING | 400<br>360<br>320<br>280 |

PROCESSING APPARATUS AND PROCESSING METHOD FOR PROCESSING PRINT JOBS

BACKGROUND OF THE INVENTION

1. Field of the Invention

The present invention relates to processing apparatuses and processing methods for processing print jobs.

2. Description of the Related Art

With image forming apparatuses that print on a printing medium, such as a continuous sheet (e.g., rolled sheet), the throughput can be increased by continuing to print on the rolled sheet until the rolled sheet runs out. When such continuous printing is carried out, print data needs to keep being supplied to the print engine. If the print data is not supplied in a timely manner, the printing is stopped, and the rolled sheet needs to be set again. Thus, the throughput decreases.

Print jobs are, for example, in files of a page description language (PDL) format, such as the portable document format (PDF) and the extensible markup language paper specification (XPS) format, and it takes time to carry out raster image processing (RIP) on such PDL format files. Therefore, a method is being employed in which a print job is subjected to image processing in advance and is then spooled. However, as the resolution of print data has been increasing in recent years, so does the size of the print data, leading to a problem in that a spooling unit of a sufficient capacity cannot be secured. It is possible to increase the capacity of a spooling unit by providing a large-capacity hard disk drive (HDD), but this solution has shortcomings in terms of an increase in cost. Addressing such problems, Japanese Patent Laid-Open No. 2007-83523 proposes a method called on-the-fly printing, in which a print job that takes a long time to carry out the RIP on is subjected to the RIP in advance and is then spooled and a print job that does not take a long time to carry out the RIP on is subjected to the RIP immediately before being printed and is then printed.

However, according to the method disclosed in Japanese Patent Laid-Open No. 2007-83523, whether the time it takes to rasterize a print job to bitmap data falls within a printing time is determined on a page-by-page basis for each print job, and the relationship to a preceding print job is not taken into consideration. Therefore, a print job that does not need to be spooled is also spooled, leading to a problem in that free space in a spooler is compressed.

SUMMARY OF THE INVENTION

According to an aspect of the present invention, a processing apparatus, a processing method, and a program are provided. According to another aspect of the prevent invention, a processing apparatus and a processing method that achieve increased throughput while keeping the cost for the spooling area low are provided.

According to an aspect of the present invention, a processing apparatus includes a generation unit configured to generate print data that is based on a print job, an identification unit configured to identify a preparation time necessary for preparing the print data to be generated by the generation unit, a prediction unit configured to predict a permitted time permitted until preparation of second print data to be printed after first print data is printed is completed on the basis of a preparation time necessary for preparing the first print data, a reception unit configured to receive a supply request for the print data when printing is to be carried out by a printing unit, and a determination unit configured to determine whether print data of a predetermined unit including the second print data generated by the generation unit is to be stored in a print data storage unit, before a supply request for the print data is received, on the basis of the preparation time of the second print data identified by the identification unit and the permitted time of the second print data predicted by the prediction unit.

Further features of the present invention will become apparent from the following description of exemplary embodiments with reference to the attached drawings.

BRIEF DESCRIPTION OF THE DRAWINGS

FIG. 5 illustrates an example of a print prediction table according to an exemplary embodiment of the present invention.

FIGS. 12A, 12B, and 12C illustrate examples of a print prediction table according to an exemplary embodiment of the present invention.

FIG. 13 is a flowchart illustrating a resuming process of a job control unit according to an exemplary embodiment of the present invention.

FIGS. 14A, 14B, and 14C illustrate examples of a print prediction table according to an exemplary embodiment of the present invention.

DESCRIPTION OF THE EMBODIMENTS

First Exemplary Embodiment

Figure 1:
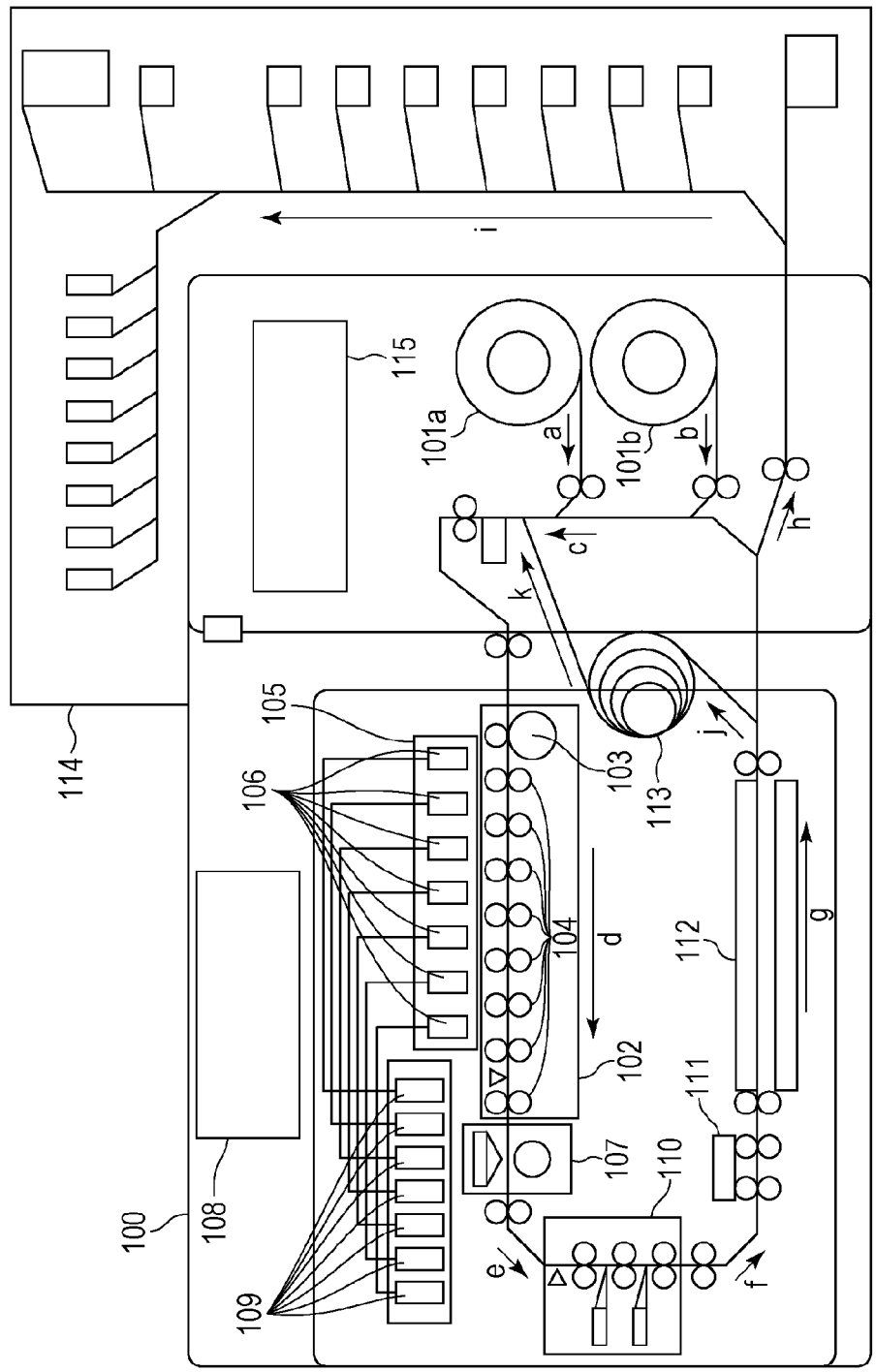
FIG. 1 illustrates an exemplary configuration of an image forming apparatus according to an exemplary embodiment of the present invention.

FIG. 1 illustrates an exemplary configuration of an image forming apparatus 100 according to an exemplary embodiment of the present invention. In the present exemplary embodiment, the image forming apparatus 100 will be illustrated as an example of the processing apparatus.

The image forming apparatus 100 prints on a printing medium. Although a rolled sheet is illustrated as an example of the printing medium in the present exemplary embodiment, the printing medium is not limited to a rolled sheet, and a different type of continuous sheet may also be used. FIG. 1 is a sectional view schematically illustrating an overall configuration of the image forming apparatus 100, in which a rolled sheet (a continuous sheet having a length that is greater than the length of a print unit (one page) in the conveying direction) is used as a printing medium. The image forming apparatus 100 includes an upper sheet cassette 101a, a lower sheet cassette 101b, a conveying unit 102, an encoder 103 for conveyance, a plurality of rotation rollers 104, a head unit 105, printing heads 106, a scanner unit 107, a control unit 108, ink tanks 109, a cutter unit 110, a back surface printing unit 111, a drying unit 112, a sheet take-up unit 113, a sorting unit 114, and an operation unit 115, and these constituent elements are disposed in a single housing. Alternatively, these constituent elements may be grouped and housed in a plurality of separate housings.

The control unit 108 includes a control section that includes a controller (including a central processing unit (CPU) or a microprocessing unit (MPU)), a device for outputting user interface information (device for generating display information and acoustic information), and various types of input/output (I/O) interfaces. The control unit 108 controls operations of the image forming apparatus 100 as a whole.

The image forming apparatus 100 includes the upper sheet cassette 101a and the lower sheet cassette 101b, which constitute a rolled sheet unit. A user mounts a rolled sheet (hereinafter, the sheet) on a magazine and then loads the magazine in the image forming apparatus 100. The sheet pulled out from the upper sheet cassette 101a is conveyed in the direction of an arrow a indicated in FIG. 1, and the sheet pulled out from the lower sheet cassette 101b is conveyed in the direction of an arrow b indicated in FIG. 1. The sheets from the upper sheet cassette 101a and the lower sheet cassette 101b both travel in the direction of an arrow c indicated in FIG. 1 and reach the conveying unit 102. The conveying unit 102 conveys the sheet in the direction of an arrow d indicated in FIG. 1 (horizontal direction) during print processing via the plurality of rotation rollers 104. When a sheet cassette from which the sheet is fed is to be switched between the upper sheet cassette 101a and the lower sheet cassette 101b, the sheet that has already been pulled out is rewound into the cassette, and another sheet is fed from a cassette in which the sheet to be fed is set.

The head unit 105 is disposed above the conveying unit 102 so as to face the conveying unit 102. The head unit 105 holds the independent printing heads 106 corresponding to respective colors (seven colors in the present exemplary embodiment) that are arrayed in the direction in which the sheet is conveyed. The image forming apparatus 100 forms an image on the sheet by ejecting ink through the printing heads 106 in synchronization with the conveyance of the sheet by the conveying unit 102. Instead of ejecting the ink directly onto the sheet, the image forming apparatus 100 may apply the ink to an intermediate transfer body and then apply that ink to the sheet so as to form an image. The conveying unit 102, the head unit 105, and the printing heads 106 constitute a printing unit. The ink tanks 109 store inks of the respective colors. The inks are supplied from the ink tanks 109 to sub-tanks provided so as to correspond to the respective colors through tubes, and the inks are then supplied from the sub-tanks to the respective printing heads 106 through tubes. The printing heads 106 are constituted by line heads corresponding to the respective colors (seven colors in the present exemplary embodiment) that are arrayed in the direction d in which the sheet is conveyed during printing. The line heads of the respective colors may be formed as a single continuous nozzle chip, or separate nozzle chips for the respective line heads may be arrayed at regular intervals along a straight line or in a staggered array.

An ink jet system for ejecting ink through the nozzles can be selected from various methods, such as a method in which a heating element is used, a method in which a piezoelectric element is used, a method in which an electrostatic element is used, and a method in which a microelectromechanical system (MEMS) element is used. The inks are ejected through the nozzles in the respective printing heads 106 in accordance with print data, and the timing of the ejection is determined in accordance with an output signal of the encoder 103 for conveyance.

It is to be noted that the present exemplary embodiment is not limited to an ink jet printer that uses ink as a recording agent. The exemplary embodiment can also be applied to various types of printing systems including a thermal printer (sublimation type, thermal transfer type, etc.), a dot impact printer, and an electrophotographic system, such as a light-emitting diode (LED) printer and a laser printer.

Upon an image being formed on the sheet, the sheet is conveyed from the conveying unit 102 to the scanner unit 107. The scanner unit 107 optically reads a printed image or a particular pattern on the sheet so as to check whether the printed image has a problem or to check the conditions of the image forming apparatus 100, such as its ink ejection condition.

The sheet is conveyed from the scanner unit 107 in the direction of an arrow e to the cutter unit 110. The cutter unit 110 cuts the sheet into pieces each having the length of a predetermined print unit. The length of the predetermined print unit differs in accordance with the image size to be printed. The cutter unit 110 cuts the sheet into pieces of respective pages in the case of single-sided printing, but the cutter unit 110 may not cut the sheet into pieces of respective pages depending on the content of a print job. In the case of duplex printing, the image forming unit 100 continuously prints images on a first surface (e.g., front surface) of the sheet up to a predetermined length without the cutter unit 110 cutting the sheet into pieces of respective pages, and the cutter unit 110 cuts the sheet into pieces of respective pages upon the image forming apparatus 100 having printed images on a second surface (e.g., back surface). The configuration of the cutter unit 110 is not limited to the one in which the cutter unit 110 cuts the sheet into pieces of respective images at the time of single-sided printing or when the back surface is printed in duplex printing. The configuration may be such that the sheet remains uncut until a portion of the sheet corresponding to a predetermined length has been conveyed and is then cut once the aforementioned portion corresponding to the predetermined length has been conveyed. Then, the resulting pieces may further be cut into pieces of respective images (respective pages) by another cutter device through a manual operation or the like. In a case in which the sheet needs to be cut along the lengthwise direction, the sheet is cut with yet another cutter device.

The sheet conveyed from the cutter unit 110 is then conveyed in the direction of an arrow f to the back surface printing unit 111. The back surface printing unit 111 prints predetermined information on the back surface of the sheet in a case in which an image is to be printed only on a single side of the sheet. In a case in which the printing heads 106 print an image for a print job of duplex printing, the back surface printing unit 111 may print the predetermined information in a region other than a region in which the printing heads 106 print the image. The back surface printing unit 111 can employ such systems as imprinting of a recording agent, a thermal transfer system, and an ink jet system.

The sheet that has passed through the back surface printing unit 111 is then conveyed to the drying unit 112. The drying unit 112 heats the sheet, which passes therethrough in the direction of an arrow g indicated in FIG. 1, with a warm air in order to dry the sheet on which the ink has been applied in a short period of time. The sheets, which have been cut into pieces each having the length of the print unit, pass, one by one, through the drying unit 112, and are conveyed in the direction of an arrow h indicated in FIG. 1 to the sorting unit 114. The sorting unit 114 holds a plurality of trays (18 trays in the present exemplary embodiment), and determines to which trays the sheets are to be discharged in accordance with the length of the print unit or the like. The sorting unit 114 discharges the sheets, which pass through the sorting unit 114 in the direction of an arrow i indicated in FIG. 1, to trays corresponding to tray numbers set for the respective printed image, while checking whether a tray is empty or is full with a sensor provided on each of the trays. A specific tray may be designated by a device that has issued the print job (host device) as a tray to which the cut sheets are to be discharged, or any empty tray may be designated by the image forming apparatus 100. Each tray can hold discharged sheets in a number up to a predetermined number. If a print job results in the number of sheets exceeding the predetermined number, the sheets are discharged over a plurality of trays. The number of sheets, the size of a sheet, or the type of a sheet that each tray can hold differs among the trays depending on the size (type) or the like of the trays. In addition, each of the plurality of trays can be provided with an order of priority, and when executing a print job, the image forming apparatus 100 successively assigns empty trays (in which sheets are not present) as sheet discharge destinations in accordance with the order of priority. This order of priority may be set in advance or may be changed as appropriate through a user operation or the like.

The sheet take-up unit 113 takes up a sheet that has images printed on the front surface thereof and has not been cut into pieces of respective pages. In the case of duplex printing, a sheet that has images formed on the front surface thereof is not cut into pieces of respective pages by the cutter unit 110 but is cut after the printing on the continuous front surface is completed. The sheet that has images printed on the front surface thereof travels in the direction of an arrow j indicated in FIG. 1 and is then taken up by the sheet take-up unit 113. Then, the sheet, which has images for a series of pages formed on the front surface thereof and has been taken up, is conveyed in the direction of an arrow k with a surface opposite to the front surface set as a printable surface, or in other words, so that the surface opposite to the front surface is to face the printing heads 106. As the sheet is conveyed in this manner, images are printed on the back surface that is opposite to the front surface. In the case of typical single-sided printing, the sheets on which images have been printed are conveyed to the sorting unit 114 without being taken up by the sheet take-up unit 113.

Figure 2:
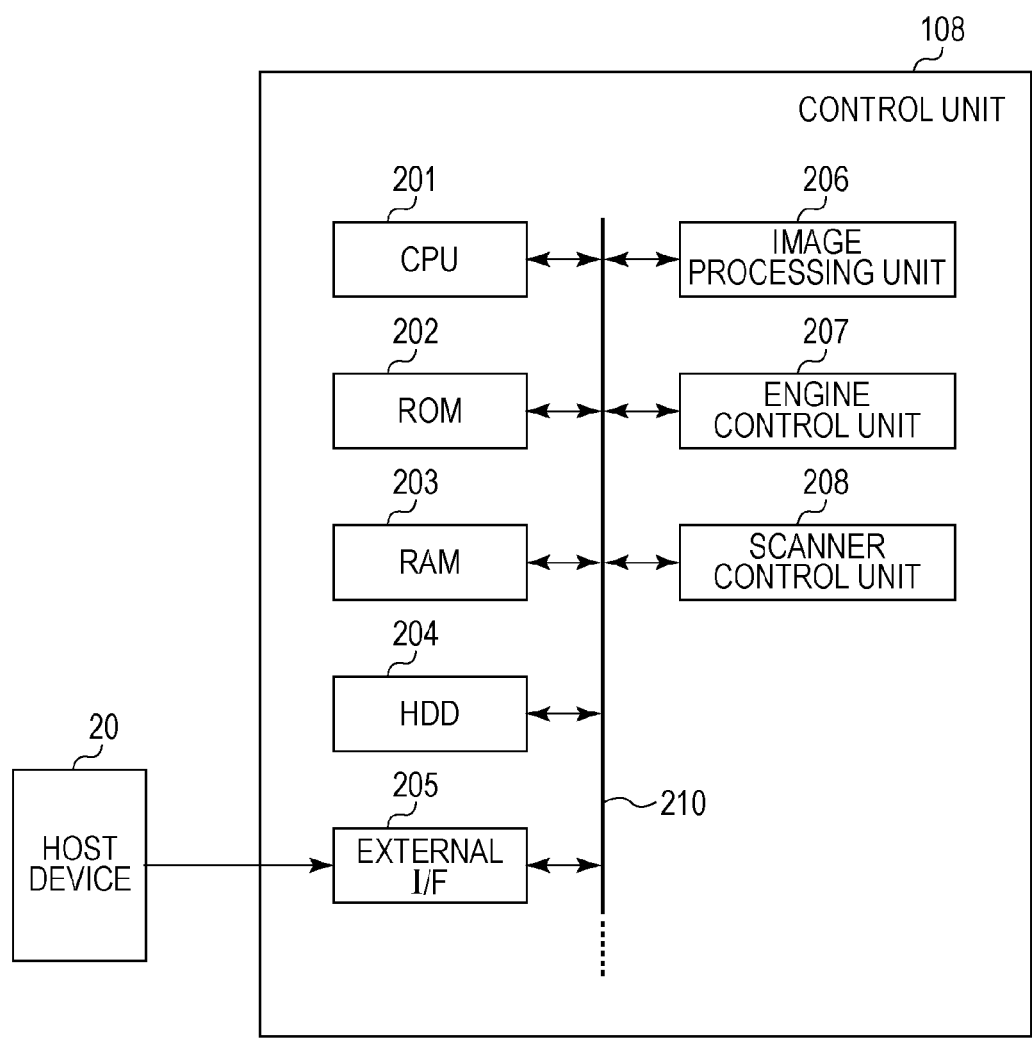
FIG. 2 illustrates an exemplary hardware configuration of a control unit of the image forming apparatus.

Subsequently, with reference to FIG. 2, an exemplary hardware configuration of the control unit 108 illustrated in FIG. 1 will be described.

The control unit 108 includes a CPU 201, a read-only memory (ROM) 202, a random-access memory (RAM) 203, an HDD 204, an external interface (I/F) 205, an image processing unit 206, an engine control unit 207, and a scanner control unit 208, which are interconnected through a system bus 210.

The CPU 201 is a central processing unit of a microprocessor (microcomputer) type. The CPU 201 controls the overall operations of the image forming apparatus 100 by executing programs and starting hardware. The ROM 202 stores programs to be executed by the CPU 201 and fixed data necessary for the image forming apparatus 100 to implement various operations. The RAM 203 is used as a work area of the CPU 201, is used as an area for temporarily storing various pieces of received data, stores various pieces of setting data, and stores a list of print jobs and job data. The HDD 204 temporarily stores image data and so on rasterized in accordance with the print jobs. In addition, the HDD 204 can store, in its built-in hard disk, or can read, from the hard disk, programs to be executed by the CPU 201, print data, and setting information necessary for the image forming apparatus 100 to implement various operations. In place of the HDD 204, another large-capacity storage device may be used.

The external I/F 205 receives a print job and so on from a host device 20. For example, a print job transmitted from the host device 20 is received via the external I/F 205. In addition, information of the print job is stored in a print job list in the RAM 203, and image data rasterized in accordance with the print job is stored in the HDD 204.

The image processing unit 206 carries out rendering processing (RIP) in accordance with a print job so as to generate image data on a page-by-page basis. Specifically, the image processing unit 206 rasterizes vector information, such as a character, a line, and an image, written in the PDL or image scanning line information, such as a color, a pattern, and a picture, into bitmap data that can be printed or displayed. In addition, the image processing unit 206 carries out, as necessary, various types of image processing, such as color space conversion (e.g., conversion from YCbCr to sRGB), resolution conversion to an effective pixel count (which can be printed by the image processing apparatus 100), image analysis, and image correction. Image data (RIP-subjected data) obtained through the image processing by the image processing unit 206 is stored, for example, in the HDD 204.

The engine control unit 207 controls the above-described printing unit in accordance with the image data so as to print an image on a sheet. The engine control unit 207, for example, issues ink ejection instructions to the printing heads 106 of the respective colors, sets ejection timings for adjusting the dot positions on the sheet, and obtains the driving conditions of the printing heads 106. The engine control unit 207 controls the driving of the printing heads 106 in accordance with the image data and causes the printing heads 106 to eject ink. Through this operation, an image is printed on the sheet. Furthermore, the engine control unit 207 controls driving of various rollers (e.g., feed roller, conveyance roller) so as to convey the sheet at an appropriate speed or stop the sheet.

The scanner control unit 208 controls an image sensor (e.g., charge-coupled device (CCD), contact image sensor (CIS)) so as to read an image on a sheet. The scanner control unit 208 obtains, as a reading value of the image, analog luminance data of red (R), green (G), and blue (B). In addition, the scanner control unit 208 analyzes the luminance data obtained from the image sensor and detects a non-discharging nozzle, a cutting position of the sheet, and so on. The host device 20 is provided outside the image forming apparatus 100 and functions as a source that supplies a print job. The host device 20 may be a computer that generates data, such as an image to be printed, or may be a reader or the like for reading an image.

The external I/F 205 transmits and receives a print job, a command, a status signal, and so on to and from the host device 20.

Subsequently, with reference to FIG. 3, an exemplary processing flow of the image forming apparatus 100 illustrated in FIG. 1 will be described in brief. The flowchart illustrates a flow of a process that is implemented as the CPU 201 loads a control program stored in the ROM 202 or the HDD 204 onto the RAM 203 and executes the control program. In this example, a flow of a process for duplex printing will be described.

The process starts upon the image forming apparatus 100 receiving a print job from the host device 20 via the external I/F 205 (S301). Upon the process being started, the image forming apparatus 100 subjects the received print job to the RIP in the image processing unit 206 (S302). The order of the RIP is determined on the basis of the priority (normal, interrupt), user designation, the paper binding type, the size of paper mounted on the image forming apparatus 100, the unit by which sheets are stacked in a sort tray, and so on. The data that has been subjected to the RIP is stored in the RAM 203 or the HDD 204 as the RIP-subjected data.

The image forming apparatus 100 prints an image on the front surface of the sheet on the basis of the RIP-subjected data for the front surface through the engine control unit 207 (S303). Specifically, the rolled sheet unit 101 feeds a sheet, and the conveying unit 102 conveys the sheet to the head unit 105. The image forming apparatus 100 prints an image on the front surface of the sheet conveyed to the head unit 105 and then conveys the printed sheet to the scanner unit 107. The image forming apparatus 100 checks the printed image with the scanner unit 107 and then conveys the printed sheet to the cutter unit 110. Then, the image forming apparatus 100 causes the sheet to pass through the drying unit 112 as a continuous sheet without the cutter unit 110 cutting the sheet. After the printed image has been dried, the sheet take-up unit 113 takes up the continuous sheet. When all of the RIP-subjected data to be printed on the front surface has been printed or when the printing on the front surface is completed in accordance with a predetermined setting (the number of images, the number of print lines, the print duration, etc.), the image forming apparatus 100 cuts the sheet at a portion following the last image printed on the front surface (S304).

Upon the printing on the front surface being completed, the image forming apparatus 100 starts printing on the back surface of the sheet on the basis of the RIP-subjected data for the back surface through the engine control unit 207. Specifically, the image forming apparatus 100 reverses the sheet that has had images printed on the front surface thereof and that has taken up by the sheet take-up unit 113, and the conveying unit 102 then conveys the sheet to the head unit 105. The image forming apparatus 100 prints an image to be printed on the back surface of the sheet at a portion opposite to a corresponding image on front surface of the sheet conveyed to the head unit 105 and then conveys the sheet to the scanner unit 107.

The image forming apparatus 100 checks the printed image with the scanner unit 107 and then conveys the printed sheet to the cutter unit 110. The image forming apparatus 100 cuts the sheet into pieces each having the length of the print unit with the cutter unit 110 (S305).

The sheets that have each been cut to the length of the predetermined print unit are caused to pass through the drying unit 112 so as to be dried and are then conveyed to the sorting unit 114. The sheets are conveyed to trays designated for the respective images (S306), and thus the duplex printing process is terminated.

Although an image forming apparatus configured such that the front surface and the back surface are printed by a single image forming apparatus 100 is illustrated in the present exemplary embodiment, a tandem configuration in which an image forming apparatus dedicated for printing the front surface and another image forming apparatus dedicated for printing the back surface are prepared separately may also be employed. When the tandem configuration is employed, for example, the configuration of the image forming apparatus may be similar to the configuration of that of the present exemplary embodiment except in that the sheet take-up unit 113 is not provided. In this case, a sheet that has images printed on the front surface thereof by the image forming apparatus dedicated for printing the front surface, for example, is conveyed to the image forming apparatus dedicated for printing the back surface, and images are printed on the back surface of the sheet in the image forming apparatus dedicated for printing the back surface on the basis of the RIP-subjected data for the back surface.

Figure 3:
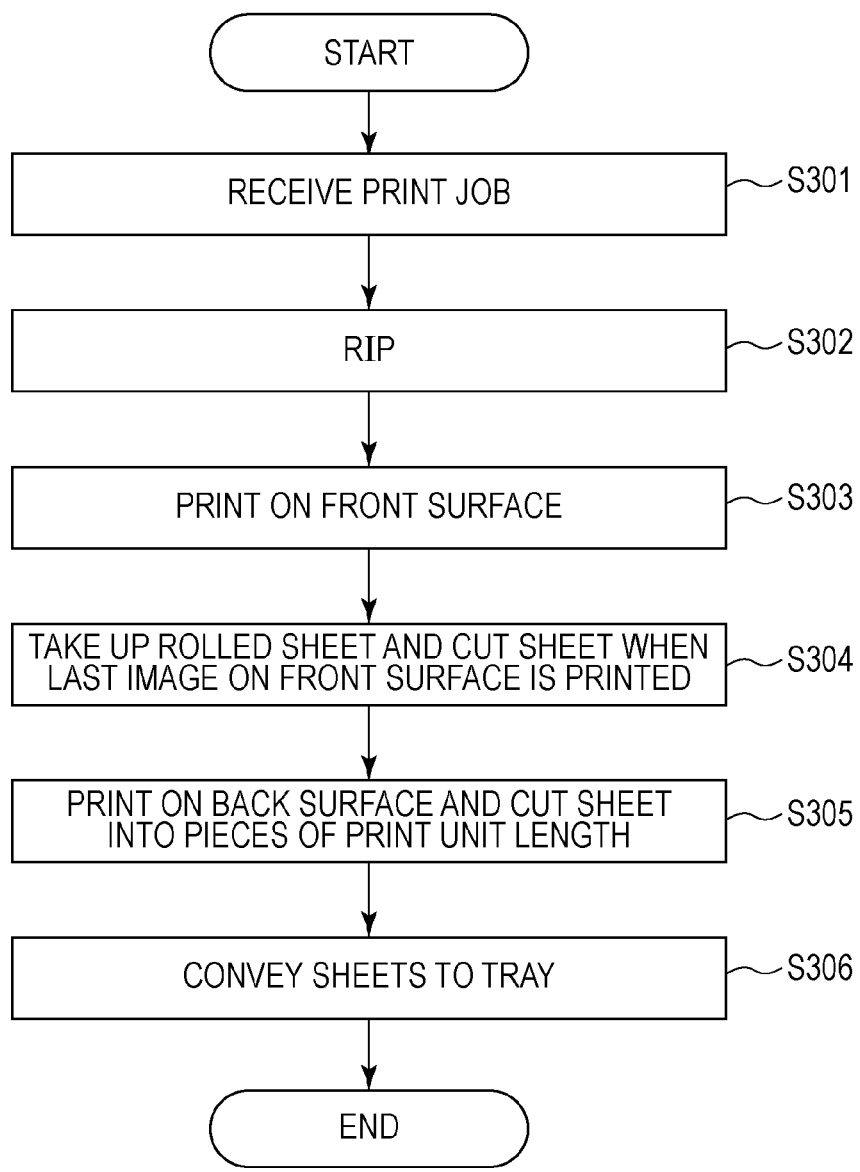
FIG. 3 is a flowchart illustrating an exemplary processing flow of an image forming apparatus according to an exemplary embodiment of the present invention.

Although the case of duplex printing has been described in the flow illustrated in FIG. 3, in the case of single-sided printing, after the front surface of the sheet has been printed in S303, the sheet is cut into pieces each having the length of the predetermined print unit by the cutter unit 110, and the sheets may then be dried and conveyed.

Now, with reference to FIG. 4, an exemplary functional control unit for the RIP to be implemented by the control unit 108 illustrated in FIG. 1 will be described.

The control unit 108 implements a job control unit 401, a print job reception unit 402, an image processing unit 403, a print data storage unit 404, a printer engine transmission unit 405, and a user interface (UI) control unit 406, as the CPU 201 executes a program stored in the ROM 202 or the like.

The control unit 108 further includes a first low-speed spooler 407 for storing print job and a second low-speed spooler 4 for storing print data. These spoolers 407 and 409 are implemented, for example, by the HDD 204, and although the reading speed of these spoolers 407 and 409 is low, these spoolers 407 and 409 are inexpensive.

The control unit 108 further includes a first high-speed spooler 408 for storing print job and a second high-speed spooler 410 for storing print data. These spoolers 408 and 410 are implemented, for example, by a RAMDISK by using the RAM 203, and although the reading speed of these spoolers 408 and 410 is high, these spoolers 408 and 410 are more expensive than the HDD 204 or the like.

In other words, the first high-speed spooler 408 for storing print job has a higher access speed than the first low-speed spooler 407 for storing print job, and the second high-speed spooler 410 for storing print data has a higher access speed than the second low-speed spooler 409 for storing print data.

The job control unit 401 controls overall processes pertaining to print jobs. Specifically, the job control unit 401 instructs the image processing unit 403 to start the RIP and determines whether print data obtained through the RIP (RIP-subjected data) is to be transmitted to the printer engine transmission unit 405 or to the print data storage unit 404. In addition, the job control unit 401 generates a print prediction table 411. In the present exemplary embodiment, the job control unit 401 receives information on the time it has taken to carry out the RIP or parameters necessary for printing from the image processing unit 403 and records the received information and parameters in the print prediction table 411. In addition, the job control unit 401 predicts how much time is permitted before printing and records the predicted time in the print prediction table 411. The job control unit 401 updates the print prediction table 411 as appropriate. On the basis of the result of updating the print prediction table 411, the job control unit 401 instructs the print job reception unit 402 to store a print job that is temporarily stored in the first low-speed spooler 407 for storing print job into the first high-speed spooler 408 for storing print job.

The print job reception unit 402 receives a print job transmitted from the host device 20. The print job received by the print job reception unit 402 is temporarily stored in the first low-speed spooler 407 for storing print job. At this point, the print job, for example, is associated with parameter information that indicates the order in which the print job is submitted to the first low-speed spooler 407 for storing print job and is then stored in the first low-speed spooler 407 for storing print job. The RIP-subjected data of the print job tends to increase in the data amount as compared to data that has not been subjected to the RIP.

The image processing unit 403 carries out the RIP on a print job on the basis of an instruction from the job control unit 401 so as to generate print data. In addition, the image processing unit 403 returns information on the time it has taken to carry out the RIP and parameters necessary for printing to the job control unit 401.

The print data storage unit 404 carries out a process of storing the print data obtained through the RIP in the second low-speed spooler 409 for storing print data or the second high-speed spooler 410 for storing print data, in accordance with an instruction from the job control unit 401. At the time of printing, the print data storage unit 404 carries out a process of obtaining the print data obtained through the RIP from the second low-speed spooler 409 for storing print data or the second high-speed spooler 410 for storing print data.

The printer engine transmission unit 405 transmits the print data obtained through the RIP to the engine control unit 207 in accordance with an instruction from the job control unit 401.

The UI control unit 406 inputs a user instruction inputted through the operation unit 115 to the image forming apparatus 100 and controls the display of various pieces of information on the operation unit 115. Examples of the user instructions include an instruction for changing the priority of a print job in a case in which the user wants the print job to be printed at an earlier timing than a typical timing and an instruction for canceling a submitted print job.

Now, with reference to FIG. 5, an example of the print prediction table 411 illustrated in FIG. 4 will be described.

As illustrated in FIG. 5, the print prediction table 411 includes a print job number 501, a page number 502, a RIP time 503, an image size 504 of print data obtained through the RIP, a printing method 505, and a time 506 permitted before printing. The RIP time 503 is specified for each page. The RIP time 503 as used herein refers to the time it takes to supply print data (RIP-subjected data), or in other words, the time it takes to prepare for printing (time it takes to enter a state in which printing can be executed). Specifically, the RIP time 503 refers to the time it takes to read out a print job from a print job storing spooler and carry out the RIP on the print job, or the time it takes to read out RIP-subjected data from a print data storing spooler. In addition, the time 506 permitted before printing refers to the time permitted as the RIP time for a target print page, and in the present exemplary embodiment, for example, the time 506 permitted before printing can be predicted on the basis of the time at which a print page preceding the target print page finishes being printed. In FIG. 5, the RIP time 503 and the time 506 permitted before printing are indicated by relative times, which are not given any specific units. In addition, the image size 504 is a size in which a print job is printed and may differ for each print unit (print page in the present exemplary embodiment). The printing method 505 is a parameter set in a print job, and indicates various pieces of information, such as the number of copies, whether to print through single-sided printing or duplex printing, and layout information at the time of printing (1-in-1, 2-in-1, 4-in-1, etc.).

The time it takes to read out RIP-subjected data from the second low-speed spooler 409 for storing print data and the time it takes to read out RIP-subjected data from the second high-speed spooler 410 for storing print data may be specified by predicting the times in advance or by obtaining the times from the outside. It is not necessary to specify the time it takes to read out data of each data size, and if it is possible to specify the time it takes to read out data of any given data size, the time it takes to read out data of other data sizes can be estimated. The following description is based on the assumption that it takes 80 to print a single page when the image size 504 of print data is A4-size and it takes 40 to print a single page when the image size 504 is L-size. In addition, it takes 110 to read out print data of A4-size from the second low-speed spooler 409 for storing print data, and it takes 50 to read out such print data from the second high-speed spooler 410 for storing print data. Furthermore, it takes 50 to read out print data of L-size from the second low-speed spooler 409 for storing print data, and it takes 20 to read out such print data from the second high-speed spooler 410 for storing print data. In addition, reading out a print job from the first high-speed spooler 408 for storing print job and carrying out the RIP on the print job is 20% faster than reading out a print job from the first low-speed spooler 407 for storing print job and carrying out the RIP on the print job. As described above, the time 506 permitted before printing can be predicted on the basis of the time at which a print page preceding the target print page finishes being printed. Specifically, the time 506 permitted before printing can be specified on the basis of the time permitted before printing a print page preceding the target print page, the RIP time 503 for the target print page, and the time it takes to print the print page preceding the target print page. The time it takes to print the print page preceding the target print page can be specified, for example, on the basis of the image size 504 and the printing method 505.

With respect to a print job 507 with the print job number 501 of 00001001, the RIP time 503 for the first page is 300, the RIP time 503 for the second page is 330, the RIP time 503 for the third page is 310, and the RIP time 503 for the fourth page is 400. The RIP time 503 as used herein refers to the time it takes to read out the print job 507 from the first low-speed spooler 407 for storing print job, carry out the RIP on the print job 507, and supply print data (RIP-subjected data). In addition, the image size 504 of the print data obtained through the RIP of the print job 507 is the A4-size, and two copies of each page are to be printed through single-sided printing in accordance with the printing method 505. As indicated by 511 in FIG. 5, the time 506 permitted before printing each of the first through third pages of the print job 507 is NA, and the time 506 permitted before printing the fourth page is 480. The mark NA is indicated in the print prediction table 411 in a case in which the restriction does not need to be placed on the permitted time. In other words, an entity with the NA mark indicates that a problem does not arise no matter how much time it takes to carry out the RIP. Here, for example, in a case in which printing is started at a point in time at which a certain amount of RIP-subjected data has accumulated, since the printing is not started until a certain amount of RIP-subjected data has accumulated, the restriction does not need to be placed on the permitted time. In the present exemplary embodiment, printing is started when print data of three pages has accumulated in an engine buffer, and it is possible to accumulate print data of up to four pages in the engine buffer.

A reason for starting the printing at a point in time at which a predetermined amount of RIP-subjected data has accumulated is to prevent printing from stopping each time printing is started and to thus increase the throughput. Meanwhile, each time the printing stops, it takes time to initialize the print engine, and as the number of times a sheet is reversed increases, it takes time to switch to the back surface printing. Thus, the throughput decreases.

The time 506 permitted before printing the fourth page of the print job 507 is 480. This value corresponds to the time it takes to print the first through third pages and indicates that the printing does not need to be stopped as long as the print data can be supplied during the period of 480. Here, the RIP time 503 for the fourth page of the print job 507 is 400, which is shorter than 480 set in the time 506 permitted before printing, and thus it is understood that the RIP can be completed in a timely manner before the printing starts.

With respect to a print job 508 with the print job number 501 of 00001002, the RIP time 503 for the first page is 310→110. In addition, the RIP time 503 for the second page is 310→110, the RIP time 503 for the third page is 320→110, and the RIP time 503 for the fourth page is 330→110. The RIP time 503 indicated in FIG. 5 indicates the time it takes to read out the print job 508 from the first low-speed spooler 407 for storing print job and carry out the RIP on the print job 508 and the time it takes to read out the RIP-subjected data that has been stored in advance in the second low-speed spooler 409 for storing print data. In other words, although it takes 310 to carry out the RIP on the first page, if the print data that has been subjected to the RIP is stored in advance in the second low-speed spooler 409 for storing print data, it takes only 110 to read out the RIP-subjected data of the first page. The image size 504 of the print data obtained through the RIP of the print job 508 is the A4-size, and one copy of each page is to be printed through single-sided printing (refer to the printing method 505). As indicated by 512, the times 506 permitted before printing the first page, the second page, the third page, and the fourth page of the print job 508 are, respectively, 240, 210, 180, and 150. Therefore, it is understood that if the RIP-subjected data is stored in the second low-speed spooler 409 for storing print data, the print data for the entire pages can be supplied in time.

With respect to a print job 509 with the print job number 501 of 00001003, the RIP time 503 for the first page is 110→20. The RIP time 503 for the second page is 110→20, the RIP time 503 for the third page is 120→20, and the RIP time 503 for the fourth page is 130→20. In other words, although it takes 110 to carry out the RIP on the first page, if the print data that has been subjected to the RIP is stored in advance in the second high-speed spooler 410 for storing print data, it takes only 20 to read out the print data at the time of printing. The image size 504 of the print data obtained through the RIP of the print job 509 is the L-size, and a single copy is to be printed through single-sided printing in the 2-in-1 format (refer to the printing method 505). The times 506 permitted before printing the first page, the second page, the third page, and the fourth page of the print job 509 are, respectively, 120, 120, 60, and 60. The times 506 permitted before printing are identical for the first page and the second page and for the third page and the fourth page because the print data of two pages needs to be supplied at the same timing for the 2-in-1 format. Subsequently, with reference to FIG. 6, examples of the first low-speed spooler 407 for storing print job, the first high-speed spooler 408 for storing print job, the second low-speed spooler 409 for storing print data, and the second high-speed spooler 410 for storing print data illustrated in FIG. 4 will be described.

Figure 4:
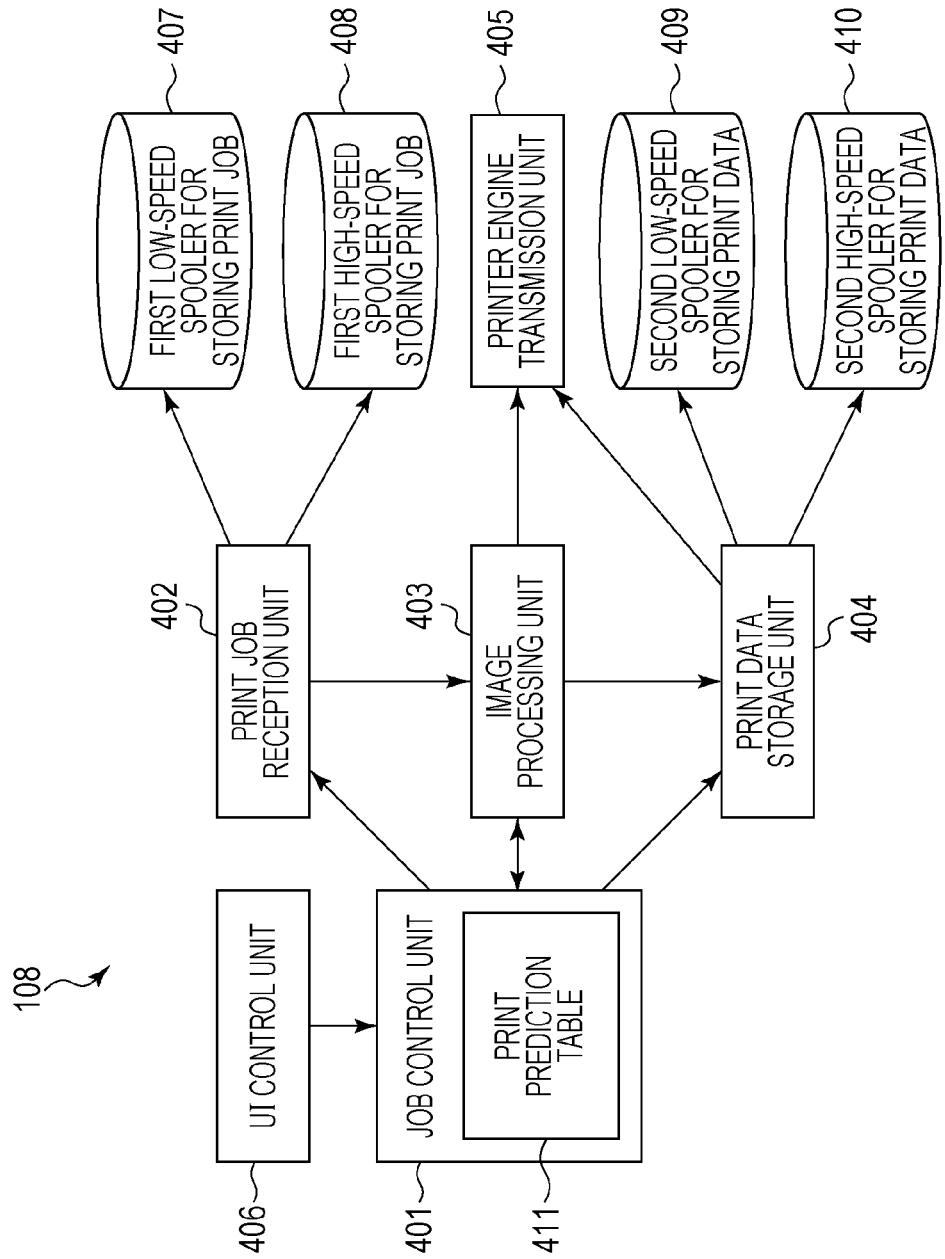
FIG. 4 illustrates an exemplary functional configuration implemented by a control unit according to an exemplary embodiment of the present invention.

FIG. 4 indicates that the first low-speed spooler 407 for storing print job stores the print job 507 with a job number 00001001, the print job 508 with a job number 00001002, and the print job 509 with a job number 00001003.

The first high-speed spooler 408 for storing print job does not store any job.

The second low-speed spooler 409 for storing print data stores print data 601 of four pages of the print job 508 with the job number 00001002 as the RIP-subjected data.

The second high-speed spooler 410 for storing print data stores print data 602 of four pages of the print job 509 with the job number 00001003 as the RIP-subjected data.

Subsequently, with reference to FIGS. 7 and 8, exemplary processing flows of the image forming apparatus 100 illustrated in FIG. 1 will be described. The flowcharts illustrate flows of processes that are implemented as the CPU 201 loads a control program stored in the ROM 202 or the HDD 204 onto the RAM 203 and executes the control program.

Figure 7:
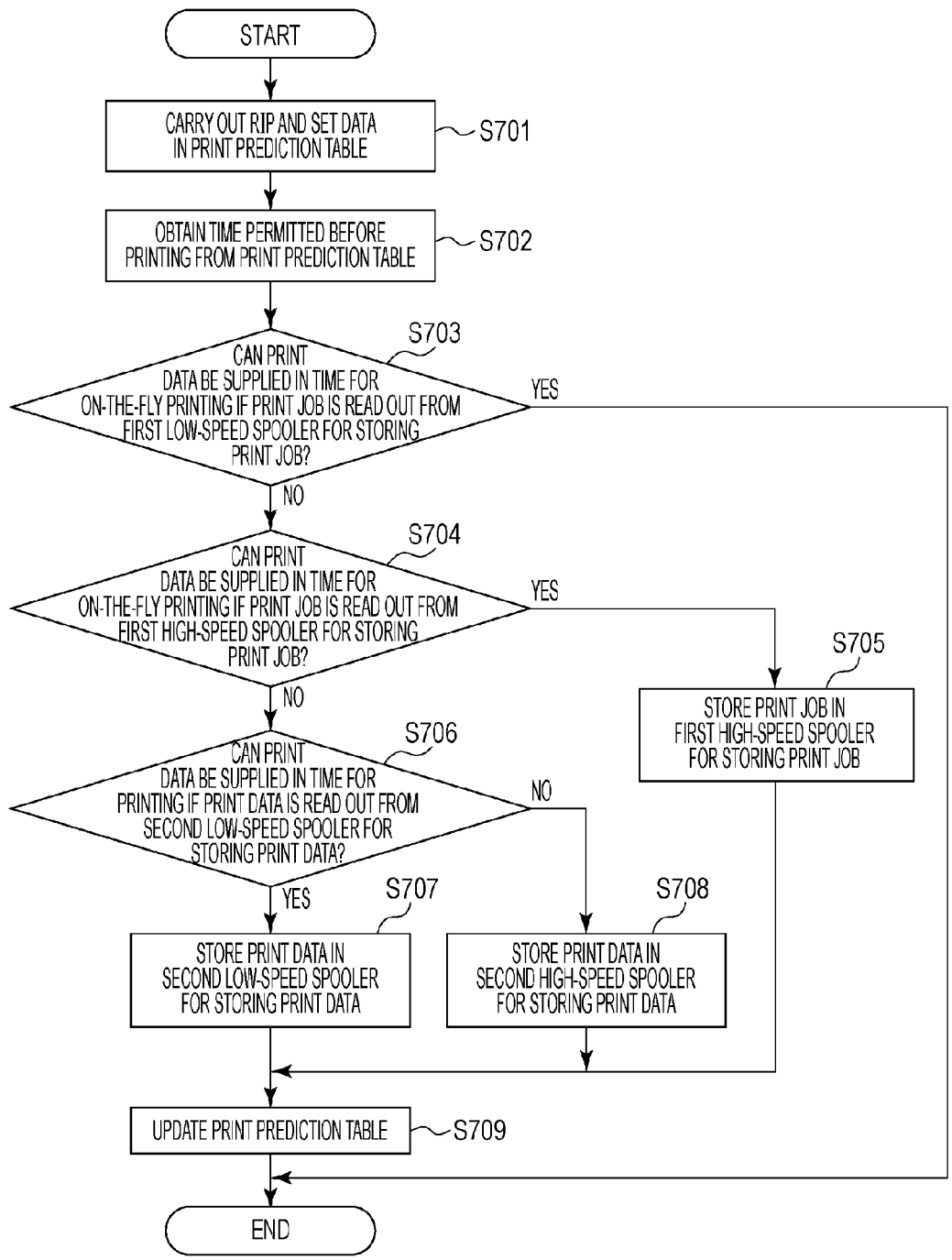
FIG. 7 is a flowchart illustrating preprocessing of a job control unit according to an exemplary embodiment of the present invention.
Figure 8:
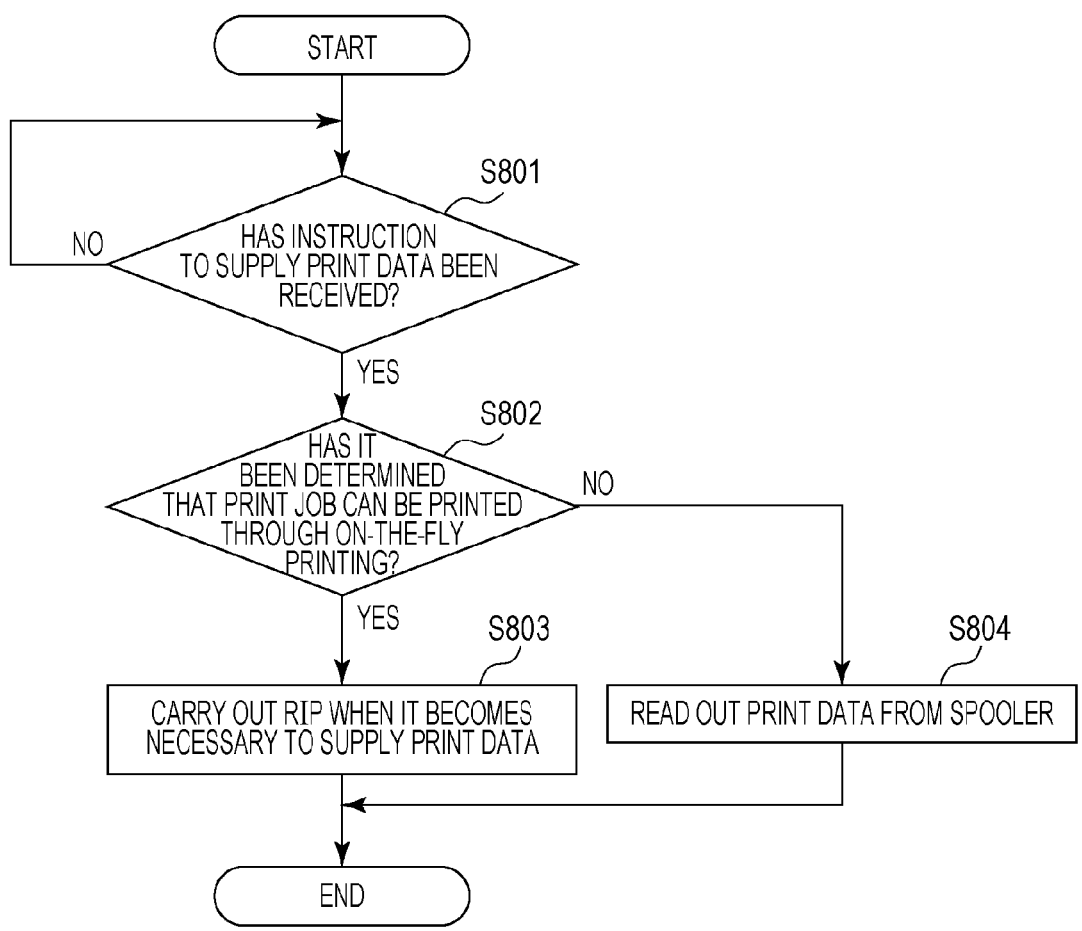
FIG. 8 is a flowchart illustrating print processing of a job control unit according to an exemplary embodiment of the present invention.

FIG. 7 is a flowchart illustrating a flow of preprocessing carried out in a time period after a print job is received and before printing is started.

The preprocessing is started upon a print job being submitted to the first low-speed spooler 407 for storing print job. Upon the preprocessing being started, the job control unit 401 instructs the image processing unit 403 to carry out the RIP on the submitted print job so as to generate print data (S701). The image processing unit 403 carries out the RIP on the print job in accordance with the instruction from the job control unit 401. In addition, the image processing unit 403 obtains information on the time it has taken to carry out the RIP and parameters necessary at the time of printing and returns the obtained information and parameters to the job control unit 401. Meanwhile, the job control unit 401 sets the information and parameters received from the image processing unit 403 in the print prediction table 411 as the initial values (S701).

Subsequently, the job control unit 401 obtains the time 506 permitted before printing from the print prediction table 411 (S702).

Then, the job control unit 401 determines whether the print data can be supplied in time for printing even if the print job is read out from the first low-speed spooler 407 for storing print job and is subjected to the RIP at the timing at which the job control unit 401 is instructed to start the print processing of the target print job (S703). In other words, the job control unit 401 determines whether the print data can be supplied in time for printing if the print job is read out from the first low-speed spooler 407 for storing print job immediately before printing and is subjected to the RIP. If the printing can be continued without stopping the printing, it is determined that the print data can be supplied in time for printing.

If it is determined in S703 that the print data can be supplied in time for the on-the-fly printing in which the print job is subjected to the RIP immediately before printing and is then printed (YES in S703), the job control unit 401 terminates the preprocessing without storing the print data that has been subjected to the RIP.

If it is determined in S703 that the print data cannot be supplied in time for the on-the-fly printing (NO in S703), the job control unit 401 carries out a process of determining whether the print data can be supplied in time for printing if the print job is read out from the first high-speed spooler 408 for storing print job and is subjected to the RIP (S704).

If it is determined in S704 that the print data can be supplied in time for the on-the-fly printing (YES in S704), the job control unit 401 carries out a process of moving the print job from the first low-speed spooler 407 for storing print job to the first high-speed spooler 408 for storing print job (S705).

In other words, the job control unit 401 moves the print job to a spooler with a higher reading speed without subjecting the print job to the RIP. Then, the preprocessing proceeds to S709.

If it is determined in S704 that the print data cannot be supplied in time for the on-the-fly printing (NO in S704), the job control unit 401 carries out a process of determining whether the print data can be supplied in time for printing if the print job that has been subjected to the RIP is stored in the second low-speed spooler 409 for storing print data and is read out therefrom at the time of printing (S706). If the printing can be continued without stopping the printing, it is determined that the print data can be supplied in time for printing.

If it is determined in S706 that the print data can be supplied in time for printing if the print data is read out from the second low-speed spooler 409 for storing print data (YES in S706), the job control unit 401 instructs the print data storage unit 404 to store the print data, which is the RIP-subjected data, into the second low-speed spooler 409 for storing print data (S707). Upon receiving the instruction from the job control unit 401, the print data storage unit 404 carries out a process of storing the print data in the second low-speed spooler 409 for storing print data. Then, the preprocessing proceeds to S709.

If it is determined in S706 that the print data cannot be supplied in time for printing if the print data is read out from the second low-speed spooler 409 for storing print data (NO in S706), the job control unit 401 instructs the print data storage unit 404 to store the print data in the second high-speed spooler 410 for storing print data (S708). Upon receiving the instruction from the job control unit 401, the print data storage unit 404 carries out a process of storing the print data in the second high-speed spooler 410 for storing print data.

In S709, the job control unit 401 carries out process of updating the RIP time and the time permitted before printing in the print prediction table 411 including the time 506 permitted before printing to be used for a subsequent print job.

In this manner, the job control unit 401 carries out the preprocessing on a print job that has temporarily been stored in the first low-speed spooler 407 for storing print job.

In the exemplary embodiment described above, in S705 of the preprocessing, the print job is moved from the first low-speed spooler 407 for storing print job to the first high-speed spooler 408 for storing print job. The exemplary embodiment, however, is not limited to such a configuration, and the print job may be moved immediately before printing within a range in which the start of the RIP is not delayed. Now, with reference to the example illustrated in FIGS. 5 and 6, the specific flow of the preprocessing illustrated in FIG. 7 in a case in which the print job 507, the print job 508, and the print job 509 are submitted in this order will be described.

As described above, in the print prediction table 411, the time 506 permitted before printing does not need to be restricted for at least a portion of a print job to be printed first among the print jobs.

First, a case in which the print job 507 is submitted will be described. The job control unit 401 carries out the RIP on the print job 507 (S701), and finds that the print job 507 contains four A4-size pages, has the RIP times 503 of 300, 330, 310, and 400 for the first through fourth pages, respectively, and is specified such that two copies of each of the pages are to be printed. The job control unit 401 obtains the time 506 permitted before printing (S702), and finds that the print job 507 has the NA marks for the first through third pages as indicated by 511 and a sufficient time can be spent on the RIP. Meanwhile, the time 506 permitted before printing the fourth page is 480.

This setting indicates that it takes 80 to print one page and that two copies of each the three pages are to be printed, and thus the time 506 permitted before printing is 480. At this point, the job control unit 401 determines whether the print data can be supplied in time if the print job 507 is read out from the first low-speed spooler 407 for storing print job (S703), and determines that the print data can be supplied in time since the RIP time is only 400 as oppose to 480 (YES in S703). As a result, the print job 507 can be read out from the first low-speed spooler 407 for storing print job and printed through the on-the-fly printing.

Subsequently, a case in which the print job 508 is submitted will be described. The job control unit 401 carries out the RIP on the print job 508 (S701), and finds that the print job 508 contains four A4-size pages, has the RIP times 503 of 310, 310, 320, and 330 for the first page, the second page, the third page, and the fourth page, respectively, and is specified such that a single copy of each of the pages is to be printed. The job control unit 401 obtains the time 506 permitted before printing (S702) and finds that the time permitted before printing the first page is 240. The time 506 permitted before printing the fourth page of the print job 507 is 480, and the RIP time for the fourth page is 400, which results in a margin of (480−400)= 80. The time 506 permitted before printing is (480−400)= 80, and the RIP can be carried out on the print job 508 while two copies of the print job 507 are being printed. Thus, adding (80×2) to 80 results in the total of 240. At this point, the job control unit 401 determines whether the print data can be supplied in time for the on-the-fly printing if the print job 508 is read out from the first low-speed spooler 407 for storing print job (S703), and determines that the print data cannot be supplied in time since it takes 310 to carry out the RIP although the time 506 permitted before printing is 240 (NO in S703). Subsequently, the job control unit 401 determines whether the print data can be supplied in time if the print job 508 is read out from the first high-speed spooler 408 for storing print job (S704). The job control unit 401 determines that the print data cannot be supplied in time for printing even if the RIP can be carried out 20% faster since it still takes 248 to carry out the RIP on the first page although the time 506 permitted before printing is 240, (NO in S704). Furthermore, the job control unit 401 determines whether the print data can be supplied in time if the print data is read out from the second low-speed spooler 409 for storing print data (S706). It takes only 110 to read out the print data of A4-size from the second low-speed spooler 409 for storing print data, and thus the RIP (read) time for each of the first through fourth pages is 110. Furthermore, it takes only 80 to print one A4-size page, and thus, although the time 506 permitted before printing is reduced by 30 per page, the time it takes to carry out the RIP can be contained within the time 506 permitted before printing. Specifically, the time 506 permitted before printing is 240 for the first page, 210 for the second page, 180 for the third page, and 150 for the fourth page, which are greater than 110 or the time it takes to read out the print data from the second low-speed spooler 409 for storing print data. In other words, the job control unit 401 determines that the print data can be supplied in time for printing (YES in S706). The print data storage unit 404 carries out a process of storing the print data in the second low-speed spooler 409 for storing print data (S707). As a result, the print data for the print job 508 is stored in the second low-speed spooler 409 for storing print data illustrated in FIG. 6. Then, the job control unit 401 updates the RIP time for each page in the print prediction table 411 to 110 and updates the time 506 permitted before printing as the RIP time is changed (S709), and the process is terminated.

Lastly, a case in which the print job 509 is submitted will be described. The job control unit 401 carries out the RIP on the print job 509 (S701), and finds that the print job 509 contains four L-size pages, has the RIP times 503 of 110, 110, 120, and 130 for the first page, the second page, the third page, and the fourth page, respectively, and is specified such that a single copy of each page is to be printed in 2-in-1 format. The job control unit 401 obtains the time 506 permitted before printing (S702) and finds that the time 506 permitted before printing the first page is 120. The time 506 permitted before printing the fourth page of the print job 508 is 150, and it takes 110 to read out the print data of the fourth page. Adding the time it takes to print one copy of the fourth page results in the time 506 permitted before printing of (150−110)+80=120. At this point, the job control unit 401 determines whether the print data can be supplied in time if the print job 509 is read out from the first low-speed spooler 407 for storing print job (S703). The job control unit 401 determines that the print data cannot be supplied in time for printing since the time 506 permitted before printing is 120 although it takes the total of 220 to carry out the RIP on the first page and the second page (NO in S703). In addition, the job control unit 401 determines whether the print data can be supplied in time for printing if the print job 509 is read out from the first high-speed spooler 408 for storing print job and is subjected to the RIP (S704). The job control unit 401 determines that the print data cannot be supplied in time for printing since it still takes 88 to carry out the RIP on a single page even if the RIP can be carried out 20% faster and since it takes 176 to carry out the RIP on two pages although the time 506 permitted before printing is 120 (NO in S704). Furthermore, the job control unit 401 determines whether the print data can be supplied in time if the print data is read out from the second low-speed spooler 409 for storing print data (S706). It takes only 50 to read out the print data of L-size from the second low-speed spooler 409 for storing print data, and thus the RIP time 503 for each of the first through fourth pages is 50. Whereas the time 506 permitted before printing the first page and the second page is 120, the total RIP time for the first page and the second page is 100, and thus the print data of the first page and the second page can be supplied in time for printing. However, the print data of the third page and the fourth page cannot be supplied in time for printing. Specifically, in the case of 2-in-1 format, two pages are printed simultaneously, and thus the time 506 permitted before printing the third page and the fourth page is (120−100)+40=60 for each of the third and fourth pages even if 40 or the time for printing the first page and the second page is added. Therefore, it is determined that the print data of the third page and the fourth page cannot be supplied in time for printing (NO in S706). Meanwhile, it takes only 20 to read out the print data from the second high-speed spooler 410 for storing print data, and thus the RIP (read) time for each of the first through fourth pages is 20. Whereas the time 506 permitted before printing the first page and the second page is 120, the total RIP time is 40, and thus the print data of the first page and the second page can be supplied in time for printing. In addition, whereas the time 506 permitted before printing the third page and the fourth page is 60, it takes only 40 to read out the print data of the third page and the fourth page. Therefore, the job control unit 401 determines that the print data can be supplied in time for printing if the RIP-subjected data is read out from the second high-speed spooler 410 for storing print data. As a result, the print data for the print job 509 is stored in the second high-speed spooler 410 for storing print data illustrated in FIG. 6. Then, the job control unit 401 updates the RIP time for each of the pages in the print prediction table 411 to 20 and updates the time 506 permitted before printing as the RIP time is changed (S709), and the process is terminated.

In FIG. 7, if the determination is NO in S704, the time it takes to read out a print job from a print job storing spooler and carry out the RIP on the print job and the time it takes to read out RIP-subjected data from a print data storing spooler are retained as the RIP time. However, the exemplary embodiment is not limited to such a print prediction table. In the present exemplary embodiment, as described above, a spooler is selected that is suitable for successively printing print jobs by taking into consideration not only the RIP time for a given print job but also the time it takes to carry out the RIP on a preceding print job and print the preceding print job.

In the present exemplary embodiment, a print job is kept in the first low-speed spooler 407 for storing print job, the print job is moved to the first high-speed spooler 408 for storing print job, RIP-subjected data is stored in the second low-speed spooler 409 for storing print data, or the RIP-subjected data is stored in the second high-speed spooler 410 for storing print data. Through this configuration, the cost of the spooling area for the print data storing spoolers can be reduced, and a situation in which printing is stopped as the supply of print data is delayed can be suppressed. According to the present exemplary embodiment, a situation in which printing is stopped as the supply of print data is delayed can be suppressed through a combination of a high-speed, expensive spooler (spooling unit) and a low-speed, inexpensive spooler (spooling unit). Through this configuration, it is not necessary to prepare a large number of low-cost, low-speed spoolers, and a necessary capacity of a high-cost, high-speed spooler can be reduced.

Subsequently, with reference to FIG. 8, a flow of print processing carried out by the image forming apparatus 100 will be described. The print processing illustrated in FIG. 8 is carried out after the preprocessing illustrated in FIG. 7, which is carried out in a time period after a print job is received and before the printing is started, is carried out.

The print processing is started upon a print request being inputted from the UI control unit 406 or the host device 20. Upon the print processing being started, the job control unit 401 carries out a process of standing by until the job control unit 401 receives an instruction from the engine control unit 207 to supply print data (S801). In other words, the job control unit 401 waits to receive a request from the engine control unit 207 that the print data be supplied.

If the instruction to supply the print data is not received (NO in S801), the job control unit 401 returns to step S801, and again carries out a process of waiting for an instruction from the engine control unit 207 to supply print data.

If the instruction to supply the print data is received (YES in S801), the job control unit 401 determines whether it has been determined that the print job can be printed through the on-the-fly printing (S802).

If it is determined in S802 that it has been determined that the print job can be printed through the on-the-fly printing (YES in S802), the job control unit 401 issues instructions to the print job reception unit 402 and the image processing unit 403. Specifically, the job control unit 401 instructs the print job reception unit 402 to read out the print job from the first low-speed spooler 407 for storing print job or the first high-speed spooler 408 for storing print job and instructs the image processing unit 403 to carry out the RIP on the print job (S803).

If it is determined that it has been determined the print job cannot be printed through the on-the-fly printing (NO in S802), the job control unit 401 instructs the print data storage unit 404 to read out the print data from the second low-speed spooler 409 for storing print data or the second high-speed spooler 410 for storing print data (S804).

Figure 9:
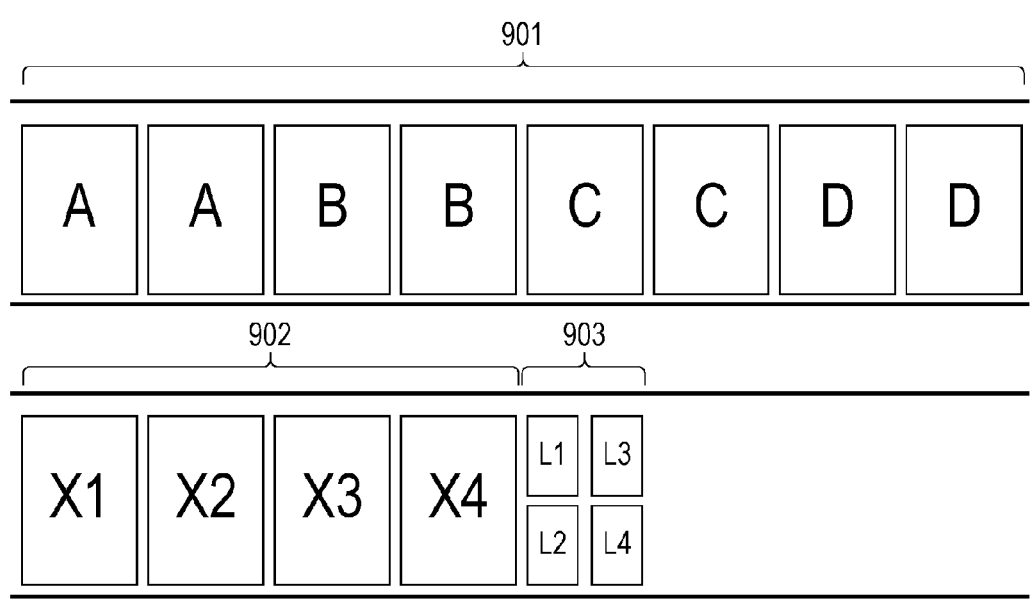
FIG. 9 illustrates exemplary images printed on a rolled sheet according to an exemplary embodiment of the present invention.

In this manner, the print job spooled in an appropriate region through the preprocessing is read out from the spooler and subjected to the RIP immediately before printing so as to be supplied as the print data. With reference to FIG. 9, how the print job 507, the print job 508, and the print job 509, which are submitted in this order, are printed on a rolled sheet will be described. Two copies of each of the four pages of the print job 507 are printed on the rolled sheet (901). In a similar manner, following the print job 507, one copy of each of the four pages of the print job 508 is printed on the rolled sheet (902). Lastly, following the print job 508, the four pages of the print job 509 are printed on the rolled sheet in 2-in-1 format (903). In this manner, when 2-in-1 printing on a continuous sheet is specified, two pages are printed side by side in the widthwise direction of the rolled sheet.

Figure 6:
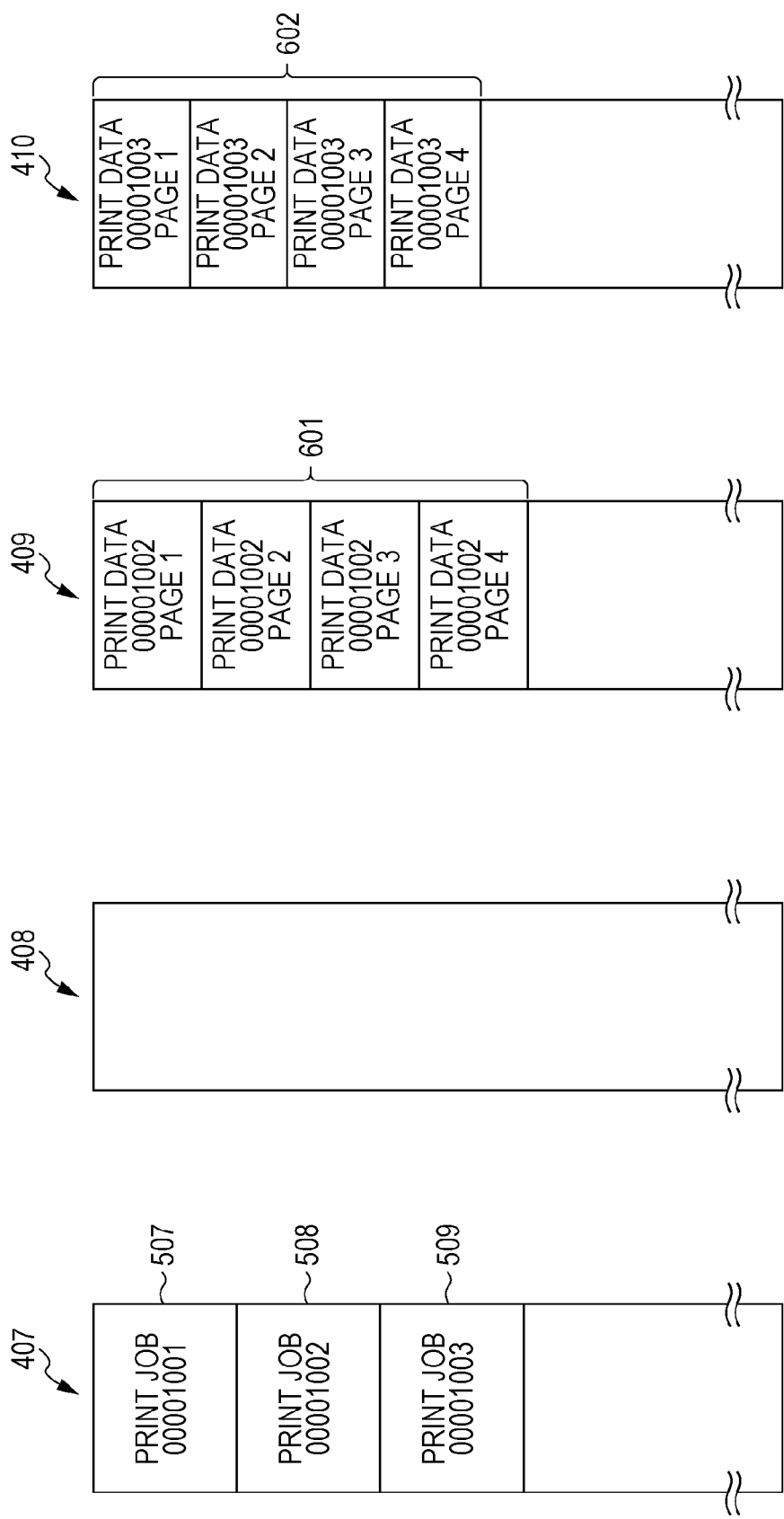
FIG. 6 illustrates exemplary spoolers according to an exemplary embodiment of the present invention.
Figure 10:
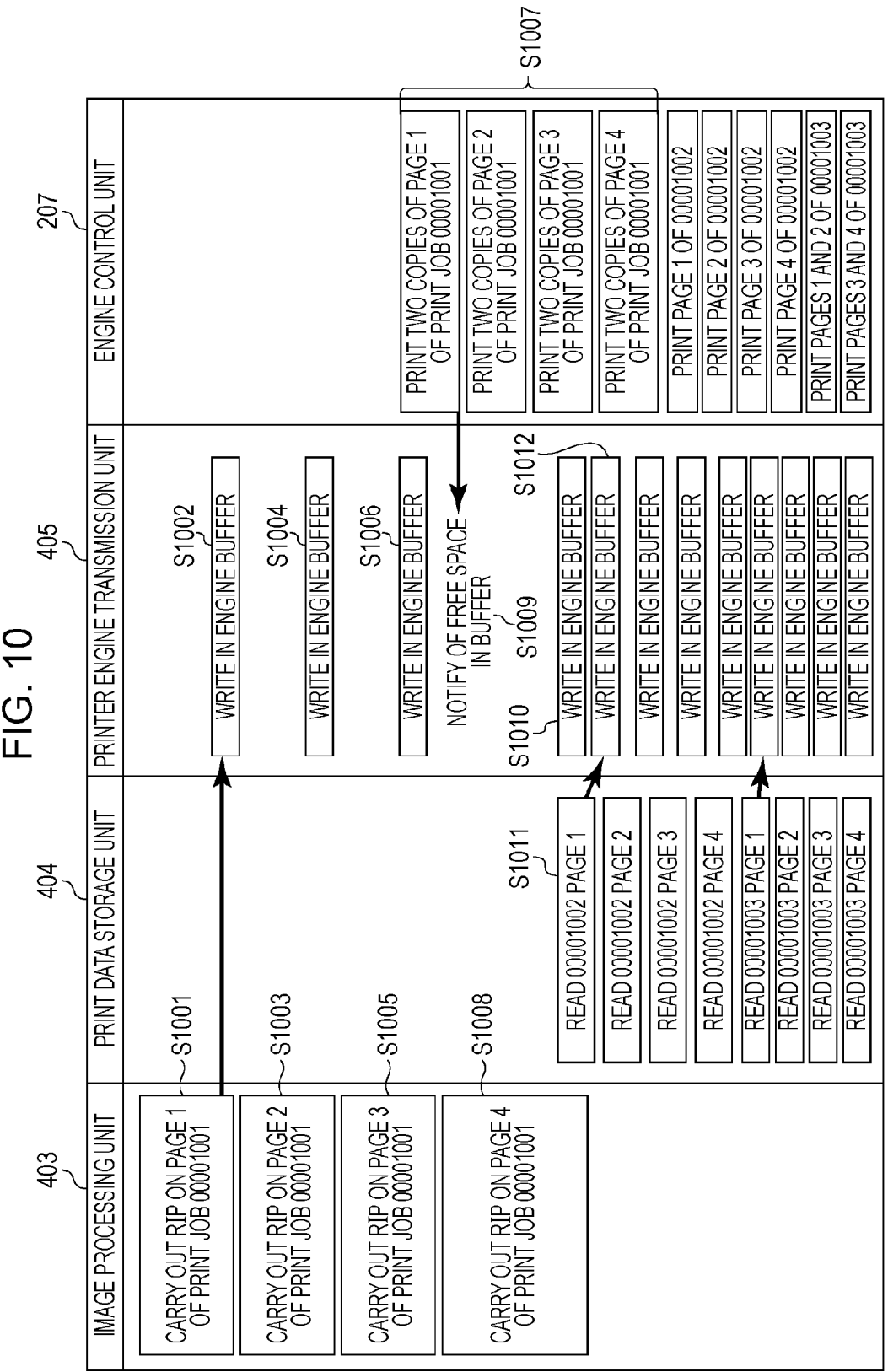
FIG. 10 is a flowchart illustrating an exchange of print data with a job control unit according to an exemplary embodiment of the present invention.

With reference to FIGS. 6 and 10, the flow of the print processing carried out in a case in which the print job 507, the print job 508, and the print job 509 are submitted in this order will be described. In the present exemplary embodiment, it has been determined through the preprocessing that the print job 507 can be read out from the first low-speed spooler 407 for storing print job and can be printed through the on-the-fly printing, and thus the print job 507 is stored in the first low-speed spooler 407 for storing print job, as illustrated in FIG. 6. In addition, it has been determined that the print data of the print job 508 can be read out from the second low-speed spooler 409 for storing print data and supplied, and thus the print data is stored in the second low-speed spooler 409 for storing print data, as illustrated in FIG. 6. It has been determined that the print data of the print job 509 can be read out from the second high-speed spooler 410 for storing print data and supplied, and thus the print data is stored in the second high-speed spooler 410 for storing print data. Upon the print processing being started, in accordance with the instruction to supply the print data, the job control unit 401 instructs the image processing unit 403 to start the RIP on the first page of the print job 507, and the image processing unit 403 carries out the RIP in accordance with the instruction (S1001). The job control unit 401 instructs the image processing unit 403 to transmit the print data to the printer engine transmission unit 405 upon completing the RIP. The image processing unit 403 transmits the print data to the printer engine transmission unit 405 upon completing the RIP, and the printer engine transmission unit 405 carries out a process of writing the print data into the engine buffer (S1002). If there is free space in the engine buffer, in accordance with the instruction to supply subsequent print data, the job control unit 401 instructs the image processing unit 403 to start the RIP on the second page of the print job 507, and the image processing unit 403 carries out the RIP in accordance with the instruction (S1003). The job control unit 401 instructs the image processing unit 403 to transmit the print data to the printer engine transmission unit 405 upon completing the RIP. The image processing unit 403 transmits the print data to the printer engine transmission unit 405 upon completing the RIP, and the printer engine transmission unit 405 carries out a process of writing the print data into the engine buffer (S1004). If there is free space in the engine buffer, in accordance with the instruction to supply subsequent print data, the job control unit 401 instructs the image processing unit 403 to start the RIP on the third page of the print job 507, and the image processing unit 403 carries out the RIP in accordance with the instruction (S1005). The image processing unit 403 transmits the print data to the printer engine transmission unit 405 upon completing the RIP, and the printer engine transmission unit 405 carries out a process of writing the print data into the engine buffer (S1006).

When the engine buffer becomes full or a specified number of pieces of print data have been stored in the engine buffer, the engine control unit 207 starts a process of printing the print job (S1007). In the present exemplary embodiment, upon the print data of three pages being written into the engine buffer, the printing by the printing unit described above is started, and two copies of the print job 507 are printed. Subsequently, the job control unit 401 instructs the image processing unit 403 to start the RIP on the fourth page of the print job 507, and the image processing unit 403 carries out the RIP in accordance with the instruction (S1008).

Upon the first page of the print job 507 having been printed, the engine control unit 207 issues a notification indicating that space has become available in the engine buffer (S1009). Upon receiving the notification indicating that space has become available in the engine buffer, the job control unit 401 instructs the image processing unit 403, which is in the middle of the RIP, to transmit the print data to the printer engine transmission unit 405 upon completing the RIP. The image processing unit 403 transmits the print data to the printer engine transmission unit 405 upon completing the RIP, and the printer engine transmission unit 405 carries out a process of writing the print data into the engine buffer (S1010). Upon the second page of the print job 507 having been printed and upon receiving the notification indicating that space has become available in the engine buffer, the job control unit 401 instructs the print data storage unit 404 to read out the print data of the first page of the print job 508 (S1011). This is because the print job 508 has been subjected to the RIP in advance and the print data thereof is stored in the second low-speed spooler 409 for storing print data. Simply by reading out the print data in the second low-speed spooler 409 for storing print data onto the print data storage unit 404, the print data of the print job 508 can be supplied to the engine buffer. Upon receiving a notification from the printer engine transmission unit 405 indicating that writing of the print data of the fourth page of the print job 508 has been completed, the job control unit 401 instructs the print data storage unit 404 to transmit the print data to the printer engine transmission unit 405 (S1012). In a similar manner, in the subsequent processes, the job control unit 401 reads out the print data in the second low-speed spooler 409 for storing print data onto the print data storage unit 404 when space becomes available in the engine buffer, and instructs the print data storage unit 404 to write the print data into the engine buffer upon the readout being completed. In this manner, by carrying out the RIP or reading out the print data, the print data can be supplied so that the printing on the rolled sheet does not stop.

As described above, by controlling data storing locations through a combination of a low-speed spooler that can be implemented through a low-speed, low-cost configuration and a high-speed spooler that can be implemented through a high-speed, high-cost configuration, printing can be continued as much as possible.

The exemplary embodiment is directed to providing a technique for determining whether a print job is to be spooled on the basis of the time it takes to print the entire job and the time it takes to carry out the RIP. In addition, the exemplary embodiment is directed to providing a spooling technique that is suitable for supplying print data in time for printing and in which a low-cost, large-capacity, low-speed spooling unit and a high-cost, small-capacity, high-speed spooling unit are combined.

Second Exemplary Embodiment

In the present exemplary embodiment, a case in which not enough free space is available in the spoolers and a case in which print data cannot be supplied in time for printing will be considered. It is to be noted that descriptions of the configurations that are similar to those of the first exemplary embodiment will be omitted.

Figure 11A:
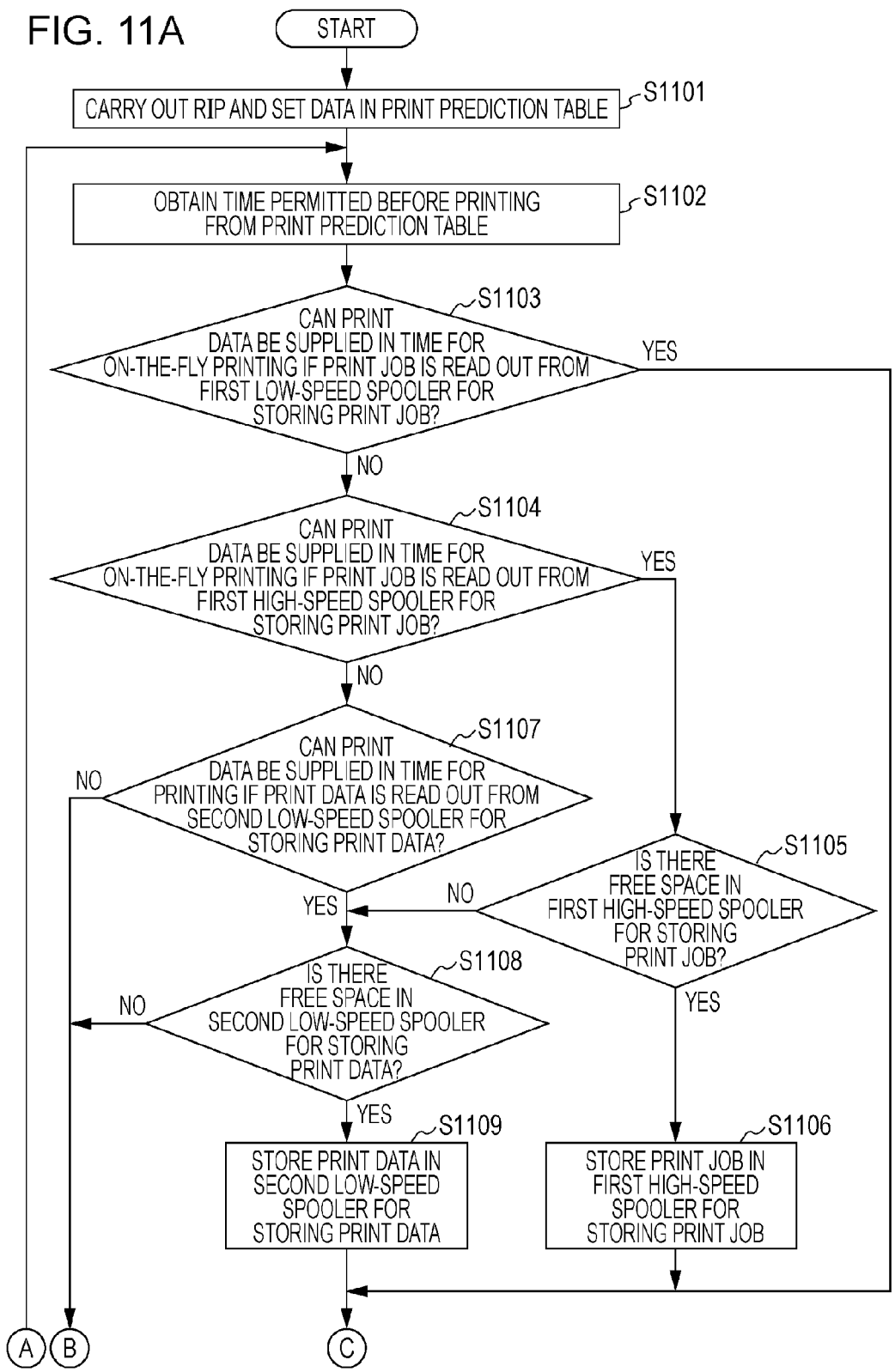
FIGS. 11A and 11B illustrate a flowchart of preprocessing of a job control unit according to an exemplary embodiment of the present invention.
Figure 11B:
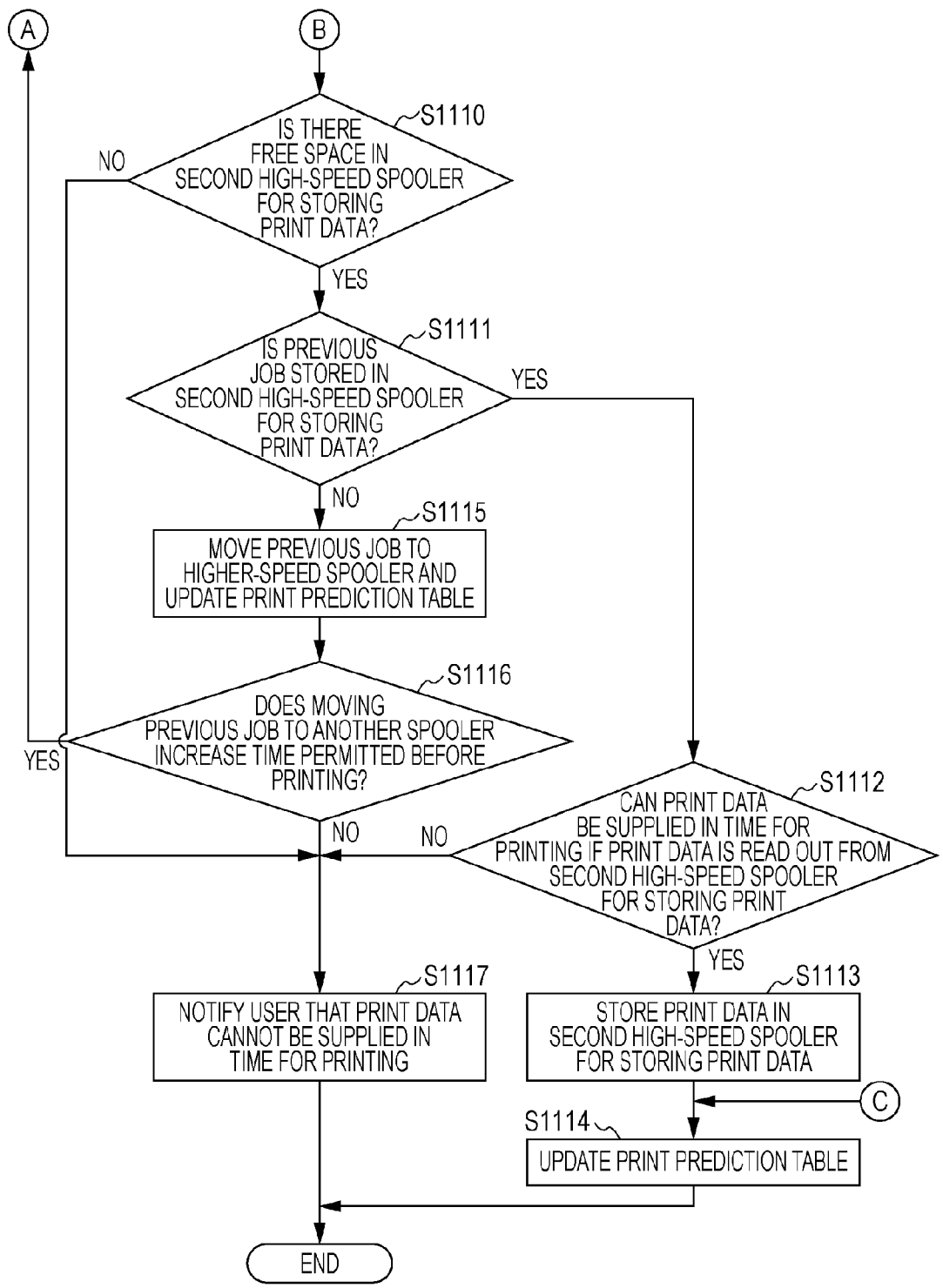

With reference to FIGS. 11A and 11B, an exemplary processing flow of the image forming apparatus 100 illustrated in FIG. 1 will be described. FIGS. 11A and 11B illustrate a flowchart of a flow of preprocessing to be carried out in a time period after a print job is received and immediately before printing is started. The flowchart illustrates a flow of a process that is implemented as the CPU 201 loads a control program stored in the ROM 202 or the HDD 204 onto the RAM 203 and executes the control program. The flow of the print processing is similar to that of the first exemplary embodiment, and thus descriptions thereof will be omitted.

The preprocessing is started upon a print job being submitted to the first low-speed spooler 407 for storing print job. Upon the preprocessing being started, the job control unit 401 instructs the image processing unit 403 to carry out the RIP on the submitted print job so as to generate print data (S1101). The image processing unit 403 carries out the RIP on the print job in accordance with the instruction from the job control unit 401. In addition, the image processing unit 403 obtains information on the time it has taken to carry out the RIP and parameters necessary at the time of printing and returns the obtained information and parameters to the job control unit 401. Furthermore, the job control unit 401 sets the information and parameters received from the image processing unit 403 into the print prediction table 411 as the initial values.

The job control unit 401 carries out a process of obtaining the time 506 permitted before printing from the print prediction table 411 (S1102).

The job control unit 401 carries out a process of determining whether the print data can be supplied in time for printing if the print job is read out from the first low-speed spooler 407 for storing print job and is subjected to the RIP at the timing at which the job control unit 401 is instructed to start the print processing of the target print job (S1103).

If it is determined in S1103 that the print data can be supplied in time for the on-the-fly printing (YES in S1103), the job control unit 401 carries out a process of updating the print prediction table 411 (S1114). In other words, the preprocessing is terminated without the print job being subjected to the RIP.

If it is determined in S1103 that the print data cannot be supplied in time for printing (NO in S1103), the job control unit 401 carries out a process of determining whether the print data can be supplied in time for printing if the print job is read out from the first high-speed spooler 408 for storing print job and is subjected to the RIP (S1104).

If it is determined in S1104 that the print data can be supplied in time for the on-the-fly printing (YES in S1104), the job control unit 401 carries out a process of determining whether there is free space in the first high-speed spooler 408 for storing print job (S1105).

If it is determined in S1105 that there is free space (YES in S1105), the job control unit 401 carries out a process of moving the print job from the first low-speed spooler 407 for storing print job to the first high-speed spooler 408 for storing print job (S1106). Thereafter, the job control unit 401 carries out a process of updating the print prediction table 411 (S1114).

If it is determined in S1105 that there is no free space (NO in S1105), the preprocessing proceeds to S1108.

If it is determined in S1104 that the print data cannot be supplied in time for the on-the-fly printing (NO in S1104), the job control unit 401 carries out a process of determining whether the print data can be supplied in time for printing if the print data that has been subjected to the RIP is read out from the second low-speed spooler 409 for storing print data. In other words, the job control unit 401 carries out a process of determining whether the print data can be supplied in time for printing if the print data that has been subjected to the RIP is stored in the second low-speed spooler 409 for storing print data and is read out therefrom at the time of printing (S1107).

If it is determined in S1107 that the print data can be supplied in time for printing (YES in S1107), the preprocessing proceeds to S1108.

In S1108, the job control unit 401 carries out a process of determining whether there is free space in the second low-speed spooler 409 for storing print data.

If it is determined in S1108 that there is free space (YES in S1108), the job control unit 401 instructs the print data storage unit 404 to store the print data into the second low-speed spooler 409 for storing print data (S1109).

If it is determined that the print data cannot be supplied in time for printing if the print data is read out from the second low-speed spooler 409 for storing print data (NO in S1107), or if it is determined that there is no free space in the second low-speed spooler 409 for storing print data (NO in S1108), the preprocessing proceeds to S1110. In S1110, the job control unit 401 carries out a process of determining whether there is free space in the second high-speed spooler 410 for storing print data.

If it is determined in S1110 that there is free space (YES in S1110), the job control unit 401 carries out a process of determining whether the processing result of a previously processed print job is stored in the second high-speed spooler 410 for storing print data (S1111).

If it is determined that the processing result is stored in the second high-speed spooler 410 for storing print data (YES in S1111), the job control unit 401 carries out a process of determining whether the print data can be supplied in time for printing if the print data is read out from the second high-speed spooler 410 for storing print data (S1112).

If it is determined that the print data can be supplied in time for printing if the print data is read out from the second high-speed spooler 410 for storing print data (YES in S1112), the job control unit 401 instructs the print data storage unit 404 to store the print data into the second high-speed spooler 410 for storing print data (S1113).

If it is determined in S1111 that the processing result is not stored in the second high-speed spooler 410 for storing print data (NO in S1111), the job control unit 401 carries out a process of moving the previous job to a higher-speed spooler and updating the print prediction table 411 (S1115). Moving the print data to a higher-speed spooler as used herein refers to storing the print data in a spooler that can reduce the above-described RIP time. In other words, a spooler having a higher reading speed is not necessarily a higher-speed spooler. Specifically, in the present exemplary embodiment, the first high-speed spooler 408 for storing print job is a higher-speed spooler than the first low-speed spooler 407 for storing print job, and the second low-speed spooler 409 for storing print data is a higher-speed spooler than the first high-speed spooler 408 for storing print job. In addition, the second high-speed spooler 410 for storing print data is a higher-speed spooler than the second low-speed spooler 409 for storing print data. For example, if the previous print job is stored in the second low-speed spooler 409 for storing print data, that print job is moved to the second high-speed spooler 410 for storing print data. If the previous print job is stored in the first high-speed spooler 408 for storing print job, that print job may be subjected to the RIP by the image processing unit 403, and the print data may be stored in the second high-speed spooler 410 for storing print data. Alternatively, if there is free space in the second low-speed spooler 409 for storing print data, the print data may be stored in the second low-speed spooler 409 for storing print data.

The job control unit 401 carries out a process of determining whether the previously processed print job has successfully been moved to a higher-speed spooler and whether the time 506 permitted before printing increases as a result of moving the print job to the higher-speed spooler (S1116).

If it is determined that the time 506 permitted before printing increases (YES in S1116), the job control unit 401 returns to step S1102 and carries out a process of obtaining the time 506 permitted before printing again. In other words, the job control unit 401 again determines in which spooler the print job is to be stored so that the print data can be supplied in time for printing.

If it is determined in S1110 that there is no free space (NO in S1110), the job control unit 401 carries out a process of instructing the UI control unit 406 to notify the user that the print data cannot be supplied in time for printing (S1117). Through this process, for example, the UI control unit 406 notifies the user that the print data cannot be supplied in time for printing by displaying an indication on the operation unit 115 that the print data cannot be supplied in time for printing or by providing such a notification through sounds. If it is determined that the print data cannot be supplied in time for printing (NO in S1112) or if it is determined that the time 506 permitted before printing does not increase (NO in S1116), the job control unit 401 carries out a similar process in S1117.

With reference to the examples of the print prediction table 411 illustrated in FIGS. 12A, 12B, and 12C, a specific flow of the preprocessing illustrated in FIG. 11 will be described.

In the examples illustrated in FIGS. 12A, 12B, and 12C, the assumption is that it takes 80 to print a single A4-size page, as in the first exemplary embodiment. In addition, it takes 110 to read out the print data of A4-size from the second low-speed spooler 409 for storing print data, and it takes 50 to read out such print data from the second high-speed spooler 410 for storing print data. In addition, reading out a print job from the first high-speed spooler 408 for storing print job and carrying out the RIP on the print job is 20% faster than reading out a print job from the first low-speed spooler 407 for storing print job and carrying out the RIP on the print job. Furthermore, printing is started when print data of three pages has accumulated in an engine buffer, and it is possible to accumulate print data of up to four pages in the engine buffer.

First, with reference to the print prediction table 411 illustrated in FIG. 12A, a specific flow of preprocessing carried out on a print job 1201 and a print job 1202 will be described.

The job control unit 401 carries out a process of determining whether the print data can be supplied in time for on-the-fly printing if the print job 1201 is read out from the first low-speed spooler 407 for storing print job (S1103).

The print job number 501 of the print job 1201 is 00002001, and the RIP time 503 is 300 for the first page, 330 for the second page, 310 for the third page, and 470 for the fourth page, as indicated in 1203 in FIG. 12A. In addition, the image size 504 of the print data obtained through the RIP of the print job 1201 is the A4-size, and two copies of each page is to be printed through single-sided printing in 1-in-1 format (refer to the printing method 505). As indicated by 1204 in FIG. 12A, the times 506 permitted before printing the first through third pages of the print job 1201 are NA, and the time 506 permitted before printing the fourth page is 480. As in the first exemplary embodiment, the mark NA is indicated in the print prediction table 411 in a case in which the restriction does not need to be placed on the time 506 permitted before printing. The time 506 permitted before printing the fourth page of the print job 1201 is 480. This value 480 corresponds to the time it takes to print the first through third pages and indicates that the printing does not need to be stopped if the print data can be supplied during the period of 480. As indicated by 1203 in FIG. 12A, the RIP time for the fourth page of the print job 1201 is 470, and the time 506 permitted before printing is 480; thus, the print data can be supplied in time.

Therefore, it is determined in S1103 that the print data can be supplied in time for the on-the-fly printing if the print job 1201 is read out from the first low-speed spooler 407 for storing print job (YES in S1103), and the print job 1201 is set to be read out from the first low-speed spooler 407 for storing print job and printed through the on-the-fly printing.

Subsequently, the job control unit 401 carries out a process of determining whether the print data can be supplied in time for on-the-fly printing if the print job 1202 is read out from the first low-speed spooler 407 for storing print job (S1103).

The print job number 501 of the print job 1202 is 00002002, the RIP time 503 for the first page is 220, the RIP time 503 for the second page is 200, the RIP time 503 for the third page is 190, and the RIP time 503 for the fourth page is 150. In addition, the image size 504 of the print data obtained through the RIP of the print job 1202 is the A4-size, and one copy of each page is to be printed through single-sided printing in 1-in-1 format (refer to the printing method 505). Then, the time 506 permitted before printing the first page of the print job 1202 is 170 (1206 in FIG. 12A). The time permitted before printing the fourth page of the print job 1201 is 480, and it takes 470 to carry out the RIP on the fourth page. Then, even the time it takes to print two copies of the fourth page is added, the time 506 permitted before printing the print job 1202 is (480−470)+(80×2)=170. The RIP time 503 for the first page of the print job 1202 is 220, which exceeds 170 set in the time 506 permitted before printing.

Therefore, the job control unit 401 determines that the print data cannot be supplied in time for the on-the-fly printing if the print job 1202 is read out from the first low-speed spooler 407 for storing print job (NO in S1103), and carries out a process of determining whether the print data can be supplied in time for the on-the-fly printing if the print job 1202 is read out from the first high-speed spooler 408 for storing print job (S1104).

The RIP time 503 for the first page of the print job 1202 is 220, and even if the RIP can be carried out 20% faster, the RIP time 503 is still 176, which exceeds 170 set in the time 506 permitted before printing. Therefore, the job control unit 401 determines that the print data cannot be supplied in time for the on-the-fly printing if the print job 1202 is read out from the first high-speed spooler 408 for storing print job (NO in S1104).

The job control unit 401 applies the time it takes to read out print data from the second low-speed spooler 409 for storing print data to the RIP time 503 of the print prediction table 411 and determines whether the print data can be supplied out in time for printing if the print data is read out from the second low-speed spooler 409 for storing print data (S1107).

As illustrated in FIG. 12B, each of the pages of the print job 1202 is in A4-size, and thus the RIP time for each page is 110. In other words, the RIP time for the first page is 220→110, the RIP time 503 for the second page is 220→110, the RIP time 503 for the third page is 190→110, and the RIP time 503 for the fourth page is 150→110 (1207). The times 506 permitted before printing the first page, the second page, the third page, and the fourth page of the print job 1202 are, respectively, 170, 140, 110, and 80 (refer to 1208 in FIG. 12B). Therefore, if the print data is read out from the second low-speed spooler 409 for storing print data, the print data for the entire pages can be supplied in time. The time 506 permitted before printing the first page of the print job 1202 can be obtained by taking into consideration that the time 506 permitted before printing the fourth page of the print job 1201 is 480, it takes 470 to carry out the RIP on the fourth page, and two copies of the fourth page are printed. Specifically, the time 506 permitted before printing is (480−470)+(80×2)=170. The time 506 permitted before printing the second page of the print job 1202 can be obtained by taking into consideration that the time 506 permitted before printing the first page of the print job 1202 is 170, it takes 110 to supply the print data, and one copy of the first page is printed. Specifically, the time 506 permitted before printing the second page of the print job 1202 is (170−110)+80=140. When the times 506 permitted before printing the third page and the fourth page are obtained in a similar manner, the respective times 506 are 110 and 80. The RIP time 503 for the fourth page of the print job 1202 is 110, which exceeds 80 set in the time 506 permitted before printing the fourth page.

Therefore, the job control unit 401 determines that the print data cannot be supplied in time for printing (NO in S1107), and carries out a process of determining whether there is free space in the second high-speed spooler 410 for storing print data (S1110). Here, the description continues under the assumption that there is free space in the second high-speed spooler 410 for storing print data (YES in S1110).

Since there is free space in the second high-speed spooler 410 for storing print data, the job control unit 401 carries out a process of determining whether a previous print job is stored in the second high-speed spooler 410 for storing print data (S1111). Specifically, the job control unit 401 checks whether the print job 1201 is stored in the second high-speed spooler 410 for storing print data. The print job 1201 is stored in the first low-speed spooler 407 for storing print job, and thus it is determined that the print job 1201 is not stored in the second high-speed spooler 410 for storing print data (NO in S1111).

Therefore, the job control unit 401 moves the previous print job (print job 1201) to a higher-speed spooler and carries out a process of updating the print prediction table 411 (S1115). Here, the description continues under the assumption that the second low-speed spooler 409 for storing print data has been selected as the higher-speed spooler. Alternatively, the first high-speed spooler 408 for storing print job may be selected as the higher-speed spooler, or the second high-speed spooler 410 for storing print data may be selected as the higher-speed spooler. Which spooler is to be selected may be determined statically in accordance with the priority set in advance or may be determined dynamically in accordance with the free space. In addition, if there are multiple candidates, after each case in which the print job is stored in one of the candidate spoolers is tested, a spooler with the largest free space while satisfying the time permitted before printing may be selected.

As the print job 1201 is subjected to the RIP and the RIP-subjected data is moved to the second low-speed spooler 409 for storing print data, the RIP time 503 for the first page becomes 300→110. In addition, the RIP time 503 for the second page is 330→110, the RIP time 503 for the third page is 310→110, and the RIP time 503 for the fourth page is 470→110 (1209).

Then, the job control unit 401 carries out a process of determining whether the time 506 permitted before printing increases as the print job 1201, which is the previous job, is moved to the second low-speed spooler 409 for storing print data, which is the higher-speed spooler (S1116). The time 506 permitted before printing the fourth page of the print job 1201 is 480, and it takes only 110 to supply the print data of the fourth page. Therefore, when the time it takes to print two copies of the fourth page is taken into consideration, the time 506 permitted before printing the first page of the print job 1202 is (480−110)+(80×2)=530. Therefore, it is determined that the time 506 permitted before printing increases from 170 to 530 (YES in S1116). As a result, the job control unit 401 carries out a process of determining whether the print data can be supplied in time for on-the-fly printing if the print job 1202 is read out from the first low-speed spooler 407 for storing print job (S1103).

Although it takes 220 to carry out the RIP on the first page of the print job 1202 (1210), the time 506 permitted before printing the print job 1202 is 530 (1211), and thus it is determined that the first page can be printed through the on-the-fly printing. Although the time 506 permitted before printing the first page is 530, it takes 220 to carry out the RIP. When 80 or the time it takes to print the first page is added, the time 506 permitted before printing the second page is (530−220)+80=390. Therefore, it is determined that the second page can be printed through the on-the-fly printing. In a similar manner, the times 506 permitted before printing the third page and the fourth page are 270 and 160, respectively. Although it takes 190 to carry out the RIP on the third page, the time 506 permitted before printing is 270, and thus it is determined that the third page can be printed through the on-the-fly printing. In a similar manner, although it takes 150 to carry out the RIP on the fourth page, the time 506 permitted before printing is 160, and thus it is determined that the fourth page can be printed through the on-the-fly printing. As a result, it is determined that the print data can be supplied in time for the on-the-fly printing if the print job 1202 is read out from the first low-speed spooler 407 for storing print job (YES in S1103).

Thus, it is determined that the print job 1201 may be subjected to the RIP in advance and stored in the second low-speed spooler 409 for storing print data and that the print job 1202 may be kept in the first low-speed spooler 407 for storing print job. Through this process, the job control unit 401 does not need to use the second high-speed spooler 410 for storing print data for the print job 1202 and can supply the print data in time for printing without consuming the capacity of the spooler. Thus, in a case in which it takes time to carry out the RIP on a print job following the print job 1202, the free space can be secured in the second high-speed spooler 410 for storing print data.

In the present exemplary embodiment, when there is free space in a spooler, a previous print job or print data that is based on the previous print job is moved to a higher-speed spooler so as to increase the time permitted before printing. Through this configuration, the higher-speed spooler does not need to be used for a predetermined print job, and the printing can be prevented from being stopped without the capacity of the high-speed spooler being consumed. Thus, the space in the high-speed spooler can be secured for carrying out the RIP on a print job following the predetermined print job. Therefore, printing can be prevented more reliably from being stopped.

In addition, in the present exemplary embodiment, when the print data cannot be supplied in time for printing, the user is notified to that effect. Thus, the user can rearrange the print jobs that have not been printed so that the printing does not stop or the user can make a change so as to increase the amount of print data to be accumulated in the engine buffer before printing starts.

Third Exemplary Embodiment

In the present exemplary embodiment, reprinting to be carried out when a rolled sheet runs out during printing or when a paper jam occurs. It is to be noted that descriptions of the configurations that are similar to those of the first exemplary embodiment will be omitted.

With reference to FIG. 13, an exemplary processing flow of the image forming apparatus 100 illustrated in FIG. 1 will be described. FIG. 13 is a flowchart illustrating a flow of resuming process carried out when printing has stopped for some reason during printing. The flowchart illustrates a flow of a process that is implemented as the CPU 201 loads a control program stored in the ROM 202 or the HDD 204 onto the RAM 203 and executes the control program. The flow of the print processing is similar to that of the first exemplary embodiment, and thus descriptions thereof will be omitted.

The resuming process described hereinafter can also be implemented through a similar flow in a case in which the order of jobs to be printed has been changed.

The resuming process is started upon the order of jobs to be printed being set after the printing stops or the printing schedule has been changed. Upon the resuming process being started, the job control unit 401 carries out a process of updating the print prediction table 411 (S1301).

The job control unit 401 obtains the time 506 permitted before printing from the print prediction table 411 and determines whether the entire print jobs can be read out in time for printing (S1302). Specifically, the job control unit 401 carries out a process of determining whether the time it takes to carry out the RIP on the entire jobs fits within the range of the time 506 permitted before printing.

If it is determined in S1302 that the time it takes to carry out the RIP fits within the range of the time 506 permitted before printing (YES in S1302), the job control unit 401 determines that the entire jobs can be read out in time for printing and terminates the process.

If it is determined in S1302 that the time it takes to carry out the RIP does not fit within the range of the time 506 permitted before printing (NO in S1302), the job control unit 401 carries out a process of identifying a print job on which the time it takes to carry out the RIP does not fit within the range of the time 506 permitted before printing (S1303).

Subsequently, the job control unit 401 determines whether the print data can be supplied in time for printing if print jobs in a range from the first print job to be printed to the print job that has been so identified that the print data thereof cannot be supplied in time for printing (the print job that does not fit within the range of the time 506 permitted before printing) are moved to a high-speed spooler (S1304).

If it is determined in S1304 that the print data cannot be supplied in time for printing even if the aforementioned print jobs are moved to the high-speed spooler (NO in S1304), the job control unit 401 carries out a process of instructing the UI control unit 406 to notify the user that the print data cannot be supplied in time for printing (S1309).

If it is determined in S1304 the print data can be supplied in time for printing if the aforementioned print jobs are moved to the high-speed spooler (YES in S1304), the job control unit 401 carries out a process of determining whether there is free space in a spooler (S1305).

If it is determined in S1305 that there is free space in the spooler (YES in S1305), the job control unit 401 carries out a process of changing the location where the print jobs are spooled (print job spooling area) so that the print data of the entire jobs can be supplied in time for printing (S1308). Specifically, the job control unit 401 changes the print job spooling location so as to store the print jobs or print data that is based on the print jobs in a higher-speed spooler. The method for changing the print job spooling location to the higher-speed spooler is not particularly limited, and the change may be made so that a spooler with the highest speed is used first or a spooler with large free space is used first. Alternatively, the user may select a spooler to be used.

If it is determined in S1305 that there is no free space in the high-speed spooler (NO in S1305), the job control unit 401 carries out a process of determining whether free space can be secured in the high-speed spooler by deleting a print job (S1306). Specifically, the job control unit 401 carries out a process of determining whether free space can be secured in the high-speed spooler by deleting one or more print jobs starting from a print job that is to start being printed at the latest timing among the print jobs in a range from the print job of which print data cannot be supplied in time for printing to the last print job.

If it is determined in S1306 that free space cannot be secured even if a print job is deleted (NO in S1306), the job control unit 401 carries out a process of instructing the UI control unit 406 to notify the user that the print data cannot be supplied in time for printing (S1309) and terminates the process.

If it is determined in S1306 that free space can be secured by deleting a print job (YES in S1306), the job control unit 401 carries out a process of deleting print jobs from the spooler sequentially from a print job that is to start being printed at the latest timing until free space is secured (S1307). Then, upon the free space being secured, the job control unit 401 carries out a process of changing the print job spooling location (S1308).

Upon changing the print job spooling location in S1308, the job control unit 401 returns to step S1301 and carries out a process of updating the print prediction table 411.

In this manner, the job control unit 401 repeats S1301 through S1308 until it is determined that the print data of the entire print jobs can be supplied in time for printing or until it becomes certain that the high-speed spooler has become unavailable and the print data thus cannot be supplied in time for printing.

With reference to the example of the print prediction table 411 illustrated in FIGS. 14A, 14B, and 14C, a specific flow of the resuming process illustrated in FIG. 13 will be described.

In the examples illustrated in FIGS. 14A, 14B, and 14C, the assumption is that it takes 80 to print a single A4-size page, as in the first exemplary embodiment. In addition, it takes 110 to read out the print data of A4-size from the second low-speed spooler 409 for storing print data, and it takes 50 to read out such print data from the second high-speed spooler 410 for storing print data. In addition, reading out a print job from the first high-speed spooler 408 for storing print job and carrying out the RIP on the print job is 20% faster than reading out a print job from the first low-speed spooler 407 for storing print job and carrying out the RIP on the print job. Furthermore, printing is started when print data of three pages has accumulated in an engine buffer, and it is possible to accumulate print data of up to four pages in the engine buffer.

First, with reference to the print prediction table 411 illustrated in FIG. 14A, a specific flow of the resuming process carried out on a print job 1401, a print job 1402, a print job 1403, and a print job 1404 will be described. Here, a case will be described in which the print prediction table 411 illustrated in FIG. 14A has been obtained by carrying out the preprocessing described in the first exemplary embodiment or the second exemplary embodiment, a paper jam has occurred while the first page of the print job 1402 is being printed after the printing has started, and the printing has thus stopped.

The RIP time 503 for each of the pages of the print job 1401 is 160 (refer to 1405). In addition, the image size 504 of the print data obtained through the RIP of the print job 1401 is the A4-size, and two copies of each page are set to be printed. The time 506 permitted before printing each of the first through third pages of the print job 1401 is NA, and the time 506 permitted before printing the fourth page is 480 (refer to 1406). As described above, the mark NA is indicated in the print prediction table 411 in a case in which the restriction does not need to be placed on the time 506 permitted before printing. The RIP time 503 for the fourth page of the print job 1401 is 160, which is shorter than 480 set in the time 506 permitted before printing, and thus the print data can be supplied in time for printing.

Subsequently, the RIP time 503 for each of the pages of the print job 1402 is 120 (refer to 1407). In addition, the image size 504 of the print data obtained through the RIP of the print job 1402 is the A4-size, and one copy of each page is set to be printed (refer to 1407). The times 506 permitted before printing the first page, the second page, the third page, and the fourth page of the print job 1402 are, respectively, 480, 440, 400, and 360 (refer to 1408). In this manner, the time it takes to carry out the RIP is 120, and the time it takes to print a single page is 80; thus, the time 506 permitted before printing decreases by 40 each time a page is printed. The time it takes to carry out the RIP on the entire pages of the print job 1402 fits within the range of the time 506 permitted before printing, and thus the print data can be supplied in time for printing.

Subsequently, the RIP time 503 for each of the pages of the print job 1403 is 160. In addition, the image size 504 of the print data obtained through the RIP of the print job 1403 is the A4-size, and two copies of each page are set to be printed (refer to 1409). The time 506 permitted before printing each of the first through fourth pages of the print job 1403 is 320 (refer to 1410). In this manner, the time it takes to carry out the RIP is 160, and the time it takes to print two copies of a single page is 160; thus, the time 506 permitted before printing does not change. The time it takes to carry out the RIP on the entire pages of the print job 1403 fits within the range of the time 506 permitted before printing, and thus the print data can be supplied in time for printing.

Subsequently, the RIP time 503 for each of the pages of the print job 1404 is 120. In addition, the image size 504 of the print data obtained through the RIP of the print job 1404 is the A4-size, and two copies of each page are set to be printed (refer to 1411). The times 506 permitted before printing the first page, the second page, the third page, and the fourth page of the print job 1404 are, respectively, 280, 240, 200, and 160 (refer to 1412). In this manner, the time it takes to carry out the RIP is 160, and the time it takes to print a single page is 80; thus, the time 506 permitted before printing decreases by 40 each time a page is printed. The time it takes to carry out the RIP on the entire pages of the print job 1404 fits within the range of the time 506 permitted before printing, and thus the print data can be supplied in time for printing.

Upon the print prediction table 411 as described above being obtained, printing starts. Then, when printing of the print job 1401 is completed and a paper jam occurs while the first page of the print job 1402 is being printed, reprinting becomes necessary.

Upon the order in which the print jobs are to be printed being set, the job control unit 401 carries out a process of updating the print prediction table 411 (S1301).

FIG. 14B illustrates the updated print prediction table 411.

In the print prediction table 411, the print job that has been printed is marked by END under the time 506 permitted before printing. In the present exemplary embodiment, the print job 1401 has been printed, and thus END is entered under the time 506 permitted before printing (1413).

Then, the print job 1402 is to be printed first after printing resumes, and thus the time 506 permitted before printing the print job 1402 is updated to NA for each of the first page through the third page and to 240 for the fourth page (refer to 1414).

In a similar manner, the time 506 permitted before printing the print job 1403 is updated. The time 506 permitted before printing each of the first through fourth pages of the print job 1403 is 200 (refer to 1415). The time 506 permitted before printing the fourth page of the print job 1402 is 240, it takes 120 to carry out the RIP on the fourth page, and it takes 80 to print the fourth page. Thus, the time 506 permitted before printing the first page of the print job 1403 is reduced by 40 and is 200. In addition, it takes 160 to carry out the RIP on each page of the print job 1403, and it takes 160 to print two copies of each page. Thus, the RIP can be completed exactly within the time it takes to print each page. Thus, the time 506 permitted before printing each of the second through fourth pages does not change.

In a similar manner, the time 506 permitted before printing the print job 1404 is updated. The times 506 permitted before printing the first page, the second page, the third page, and the fourth page of the print job 1404 are, respectively, 200, 160, 120, and 80 (1416). The time 506 permitted before printing the fourth page of the print job 1403 is 200, it takes 160 to print two copies of the fourth page, and it takes 160 to carry out the RIP. Thus, the time 506 permitted before printing the first page of the print job 1404 does not change and remains at 200. In addition, it takes 120 to carry out the RIP on each page of the print job 1404, and it takes only 80 to print each page. Thus, the times 506 permitted before printing the second page, the third page, and the fourth page are, respectively, 160, 120, and 80. In other words, the print data of the fourth page of the print job 1404 cannot be supplied in time for printing.

As a result, the job control unit 401 determines that the print data of the entire print jobs cannot be supplied in time for printing since the print data of the fourth page of the print job 1404 cannot be supplied in time for printing (NO in S1302). In S1303, the job control unit 401 identifies the print job 1404 as the print job on which the time it takes to carry out the RIP does not fit within the range of the time 506 permitted before printing.

In S1304, the job control unit 401 carries out a process of determining whether the print data can be supplied in time for printing if a higher-speed spooler is used.

FIG. 14C illustrates the print prediction table 411 obtained when the print job 1403 has been moved from the first low-speed spooler 407 for storing print job for the on-the-fly printing to the second low-speed spooler 409 for storing print data. As illustrated in FIG. 14C, by carrying out the RIP on the print job 1403 and storing the RIP-subjected data in the second low-speed spooler 409 for storing print data, the time it takes to carry out the RIP is reduced from 160 to 110 (refer to 1417). In addition, as the time it takes to print the print job 1403 is reduced by 160, and the time it takes to carry out the RIP is reduced by 50, the times 506 permitted before printing the first page, the second page, the third page, and the fourth page are each increased by 50 to, respectively, 200, 250, 300, and 350 (refer to 1418). As a result, the times 506 permitted before printing the first page, the second page, the third page, and the fourth page of the print job 1404 are, respectively, 400, 360, 320, and 280, and the print data can be supplied in time for printing.

In the present exemplary embodiment, as described above, upon finding even a single configuration of spoolers with which the print data can be supplied in time for printing, the job control unit 401 carries out a process of determining whether there is actually free space in a higher-speed spooler (S1305). If there actually is free space in the higher-speed spooler (YES in S1305), the job control unit 401 carries out a process of changing the spooling location of a print job or print data that is based on the print job (S1308). Then, on the basis of the print prediction table 411, the job control unit 401 again determines whether the print data of the entire jobs can be supplied in time for printing (S1302), and if it is determined that the print data can be supplied in time for printing (YES in S1302), the job control unit 401 terminates the resuming process.

In the present exemplary embodiment, even in a case in which printing stops as the rolled sheet runs out during printing or a paper jam occurs, high throughput can be achieved while the cost of the spooling area is kept low.

Although a case in which the spooling location of the print job 1403 has been changed as illustrated in FIG. 14C has been described in the present exemplary embodiment, the spooling location of another print job may instead be changed. In addition, as long as the condition in which the print data can be supplied in time for printing is met, a spooler different from the second low-speed spooler 409 for storing print data, such as the first high-speed spooler 408 for storing print job or the second high-speed spooler 410 for storing print data, may be selected.

The present invention is not limited to the exemplary embodiments described above. For example, although the same spooler is used for each print job in the exemplary embodiments described above, the exemplary embodiments are not limited to such a configuration, and different spoolers may be used for the respective pages of a print job. In this case, the determinations (e.g., in S703, S704, and S706 of FIG. 7) may be made not on a print job by print job basis but on a page by page basis.

Although the first low-speed spooler 407 for storing print job, the first high-speed spooler 408 for storing print job, the second low-speed spooler 409 for storing print data, and the second high-speed spooler 410 for storing print data are provided in the exemplary embodiments described above, the exemplary embodiments are not limited to such a configuration. For example, a single print job storing spooler and a single print data storing spooler may be provided. In this case, it may be determined whether a print job remains being stored in the print job storing spooler or the print job is subjected in advance to the RIP and stored in the print data storing spooler on the basis of the time it takes to print a print job to be executed preceding another print job to be executed. Alternatively, for example, the configuration may be such that the first low-speed spooler 407 for storing print job, the second low-speed spooler 409 for storing print data, and the second high-speed spooler 410 for storing print data are provided but the first high-speed spooler 408 for storing print job is not provided. In this case, for example, the processing flow may be such that S704 and S705 are not carried out in the first exemplary embodiment.

In addition, although it has been indicated that it does not matter how much time is spent on carrying out the RIP on at least part of a print job to be printed first in the print prediction table 411 as in the print job 507, the sooner the data is supplied to the engine buffer, the sooner the printing can be carried out. Therefore, it may be determined that a spooler from which the print data can be supplied as quickly as possible is used to store the first print job. In addition, although the description indicates that the number of pages that can be subjected to the RIP simultaneously is one for the sake of simplifying the description, a plurality of pages may be subjected to the RIP simultaneously.

Although the prediction has been made on a page by page basis in the exemplary embodiments described above, the exemplary embodiments are not limited to such a configuration, and the prediction may be made in units of a plurality of pages or on a print job by print job basis. In other words, a predetermined unit may be one page, a plurality of pages, or a print job.

Although the RIP time has been identified by the image processing unit 403 carrying out the RIP in advance in the exemplary embodiments described above, the exemplary embodiments are not limited to such a configuration. For example, the RIP time may be identified on the basis of the data size of a print job, a print mode (monochrome mode, color mode), the number of objects included in the data, and so on, without carrying out the RIP. In this case, the image processing unit 403 does not need to carry out the RIP in advance on the entire print jobs. The image processing unit 403 may carry out the RIP only on a print job that has been determined to be stored in the print data storing spooler, and the print data may be stored in the print data storing spooler.

Although the time permitted before printing a target page has been identified on the basis of the RIP time for a page preceding the target page, the time permitted before printing the page preceding the target page, and the time it takes to print the page preceding the target page in the exemplary embodiments described above, the exemplary embodiments are not limited to such a configuration. For example, the maintenance time for the printing unit may also be taken into consideration.

Although the image forming apparatus has served as the processing apparatus in the exemplary embodiments described above, the exemplary embodiments are not limited to such a configuration, and the processing apparatus may, for example, be an apparatus that is connected to an image forming apparatus through a network or the like. In this case, the processing apparatus may include, for example, a prediction unit that predicts a time permitted before printing and a printing time, an image processing unit, an identification unit that identifies a RIP time, and a determination unit that determines whether print data is to be stored in a print data storage unit.

The image forming apparatus described above, for example, may be a single function printer that is provided only with a printing function or a multi-function printer that is provided with a plurality of functions, such as a printing function, a FAX function, and a scanner function.

In addition, the exemplary embodiments described above can, in particular, increase the throughput of continuous printing on a continuous sheet, and a continuous sheet has been illustrated as an example of the printing medium. The exemplary embodiments, however, are not limited to such a configuration, and the effect of the present invention can be achieved even when cut sheets are used.

According to the present invention, high throughput can be achieved while the cost of the spooling area is kept low.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-117849, filed Jun. 6, 2014, which is hereby incorporated by reference herein in its entirety.

What is claimed is:

1. A processing apparatus, comprising:
a generation unit configured to generate print data that is based on a print job;
an identification unit configured to identify a preparation time necessary for preparing the print data to be generated by the generation unit;
a prediction unit configured to predict a permitted time permitted until preparation of second print data to be printed after first print data is printed is completed on the basis of a preparation time necessary for preparing the first print data;
a reception unit configured to receive a supply request for the print data when printing is to be carried out by a printing unit; and
a determination unit configured to determine whether print data of a predetermined unit including the second print data generated by the generation unit is to be stored in a print data storage unit, before a supply request for the print data is received, on the basis of the preparation time of the second print data identified by the identification unit and the permitted time of the second print data predicted by the prediction unit.

2. The processing apparatus according to claim 1, wherein, in a case in which the determination unit determines that the print data is not to be stored in the print data storage unit, the generation unit generates the print data that is based on the print job after a supply request for the print data is received.

3. The processing apparatus according to claim 1, wherein the prediction unit predicts the permitted time permitted until the preparation of the second print data is completed on the basis of the permitted time of the first print data predicted by the prediction unit, the preparation time of the first print data identified by the identification unit, and a printing time of the first print data.

4. The processing apparatus according to claim 1, wherein the identification unit can identify a time it has taken the generation unit to generate the print data as the preparation time.

5. The processing apparatus according to claim 1, wherein the identification unit can identify the preparation time on the basis of a data size of the print job.

6. The processing apparatus according to claim 1, further comprising:
a second identification unit configured to identify a printing time on the basis of an image size of the print job and print information set in the print job.

7. The processing apparatus according to claim 1, wherein, in a case in which the determination unit determines that the print data is to be stored in the print data storage unit, the identification unit identifies a time it takes to read out the second print data from the print data storage unit as the preparation time of the second print data, and the prediction unit updates the permitted time of the second print data.

8. The processing apparatus according to claim 1, wherein the print data storage unit includes a first print data storage unit and a second print data storage unit that is capable of higher-speed readout than the first print data storage unit, and
wherein the determination unit determines whether the print data of the predetermined unit including the second print data generated by the generating unit is to be stored in the first print data storage unit, in the second print data storage unit, or in neither of the first print data storage unit and the second print data storage unit.

9. The processing apparatus according to claim 1, wherein a first print job includes the first print data, and a second print job that is different from the first print job includes the second print data.

10. The processing apparatus according to claim 1, wherein a print job includes the first print data and the second print data.

11. The processing apparatus according to claim 1, wherein the predetermined unit is one of a page unit and a print job unit.

12. The processing apparatus according to claim 1, wherein, the processing apparatus includes the print data storage unit.

13. The processing apparatus according to claim 1, further comprising:
a printing unit configured to carry out printing on the basis of the print data.

* * * * *